(12) United States Patent
Tamura et al.

(10) Patent No.: US 8,813,733 B2
(45) Date of Patent: Aug. 26, 2014

(54) HAND-HELD ENGINE-POWERED TOOL

(75) Inventors: Fukushi Tamura, Hitachinaka (JP); Shigetoshi Ishida, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 1213 days.

(21) Appl. No.: 12/636,451

(22) Filed: Dec. 11, 2009

(65) Prior Publication Data

US 2010/0199949 A1 Aug. 12, 2010

(30) Foreign Application Priority Data

Dec. 11, 2008 (JP) .................................. 2008-316200
Apr. 23, 2009 (JP) .................................. 2009-105732

(51) Int. Cl.
*F02P 11/00* (2006.01)
*F02P 9/00* (2006.01)

(52) U.S. Cl.
USPC ........... 123/630; 123/334; 123/612; 123/618; 123/632

(58) Field of Classification Search
USPC ........... 123/185.3, 185.4, 334, 402, 612, 618, 123/630, 632; 30/216, 272.1, 276, 392, 501
See application file for complete search history.

(56) References Cited

U.S. PATENT DOCUMENTS

| | | | | |
|---|---|---|---|---|
| 4,651,420 A * | 3/1987 | Lonnecker | .................... | 30/296.1 |
| 4,785,540 A * | 11/1988 | Arvidsson | ........................ | 30/520 |
| 5,065,476 A * | 11/1991 | Dohse et al. | ..................... | 16/426 |
| 5,485,814 A * | 1/1996 | Tuggle et al. | .............. | 123/179.5 |
| 5,778,649 A * | 7/1998 | Losdahl et al. | .................. | 56/236 |
| 6,108,867 A * | 8/2000 | Nagashima | .................. | 16/110.1 |
| 6,973,726 B2 * | 12/2005 | Kramer | ........................... | 30/216 |
| 7,159,322 B2 * | 1/2007 | Sasaki et al. | .................... | 30/216 |
| 7,314,320 B2 * | 1/2008 | Nakamura | ..................... | 396/420 |
| 7,407,018 B2 * | 8/2008 | Sasaki | ........................... | 173/170 |
| 7,549,196 B2 * | 6/2009 | Ziegs et al. | ..................... | 16/430 |
| 7,866,048 B2 * | 1/2011 | Kodama et al. | ................. | 30/216 |
| 8,156,656 B2 * | 4/2012 | Tate et al. | ....................... | 30/392 |
| 8,539,678 B2 * | 9/2013 | Dahlberg et al. | ............... | 30/199 |
| 2003/0101600 A1 | 6/2003 | James et al. | | |
| 2005/0241161 A1 * | 11/2005 | Doragrip et al. | ................ | 30/392 |
| 2012/0073144 A1 * | 3/2012 | Tamura et al. | ............... | 30/272.1 |

FOREIGN PATENT DOCUMENTS

| | | |
|---|---|---|
| DE | 90 18 178 U1 | 4/1998 |
| DE | 198 21 145 A1 | 12/1998 |
| EP | 0 811 315 A2 | 12/1997 |
| EP | 1 541 010 A1 | 6/2005 |
| EP | 1 579 757 A1 | 9/2005 |
| JP | 2005-160303 A | 6/2005 |
| WO | WO 2006/134749 A2 | 12/2006 |

* cited by examiner

*Primary Examiner* — Mahmoud Gimie
*Assistant Examiner* — David Hamaoui
(74) *Attorney, Agent, or Firm* — Kilpatrick Townsend and Stockton LLP

(57) ABSTRACT

When throttle lever is pulled with the rotation lock member of the engine-powered tool in a state in which rotation of rear handle is permitted, the electrode terminal provided on the rotation lock member and the electrode terminal provided on throttle lever contact each other. As a result of this contact, the two output terminals of the engine generator are short-circuited, the supply of electric power to the ignition device from the engine generator is stopped and the supply of electric power from the ignition device to sparkplug in the engine is stopped. Through this, operation of the blade is prevented when rotating rear handle.

9 Claims, 25 Drawing Sheets

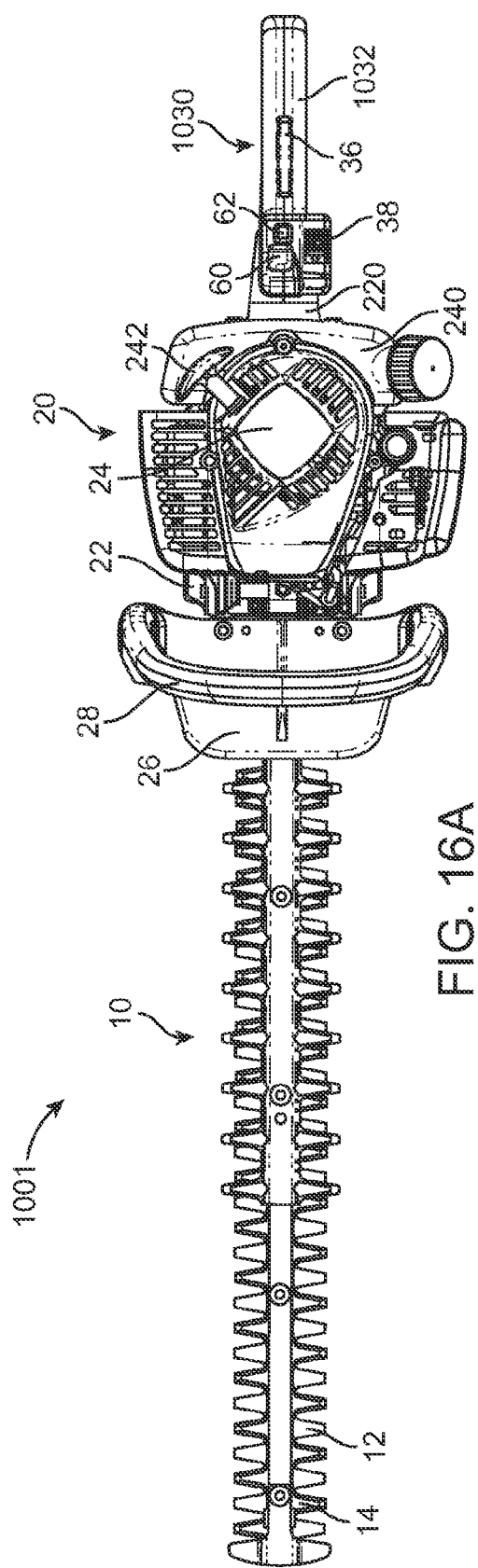
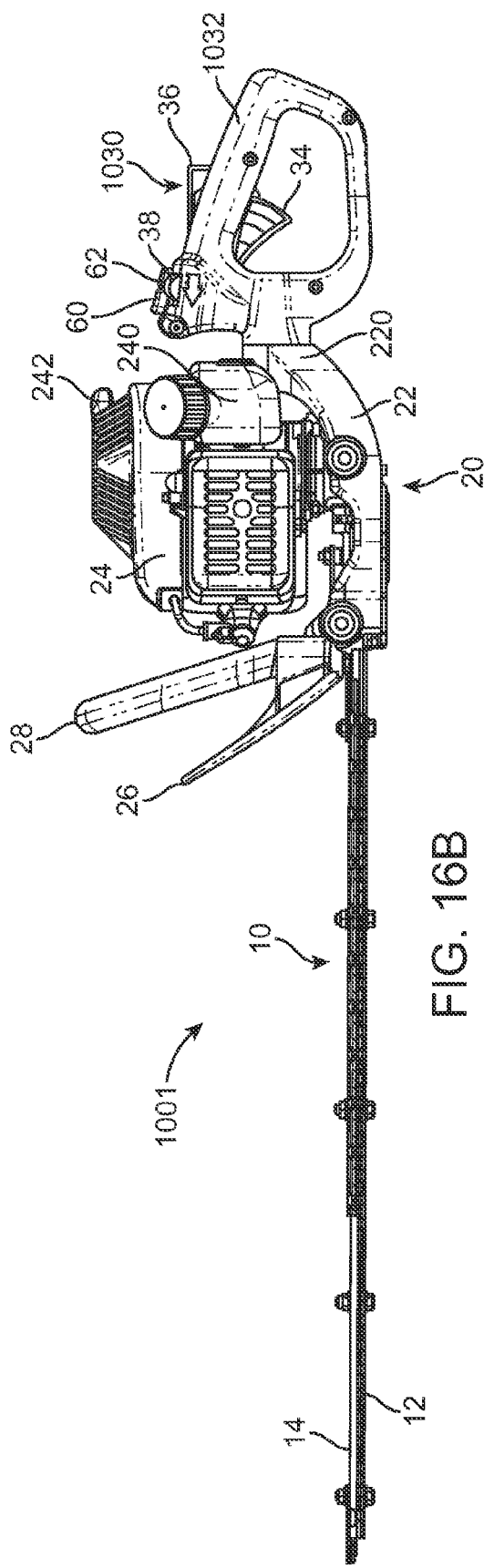
FIG. 16A
FIG. 16B

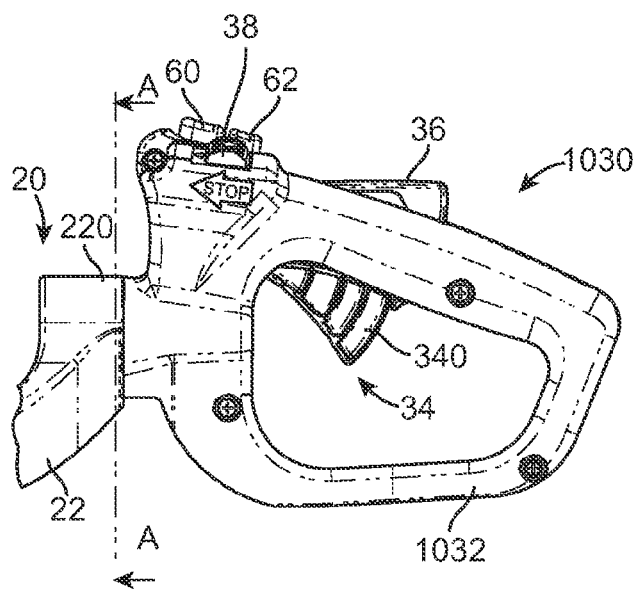
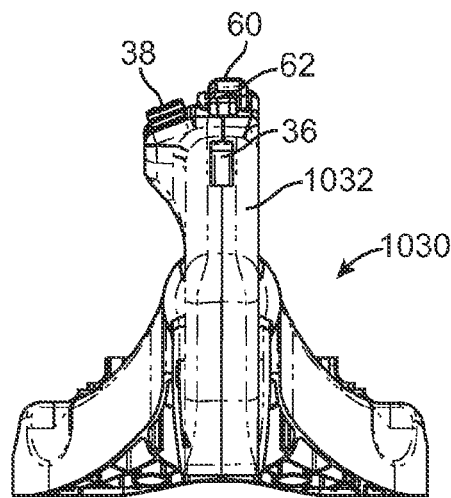
FIG. 18A  FIG. 18B
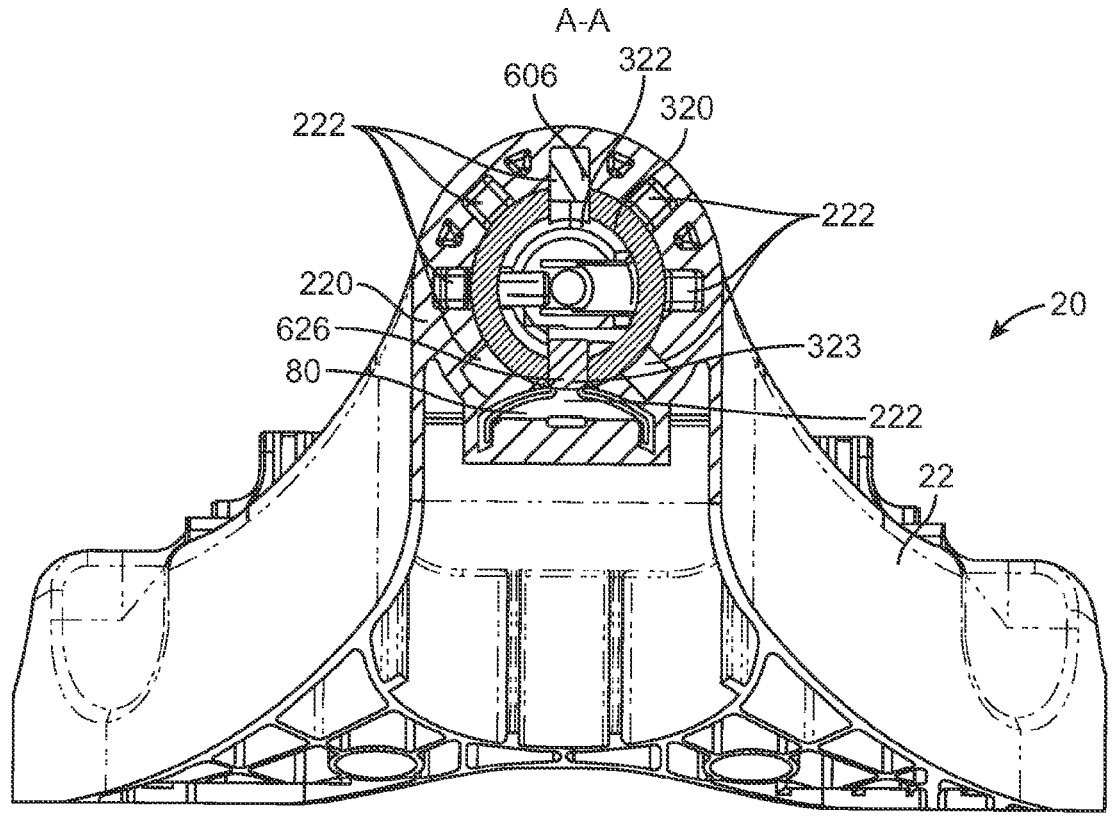
FIG. 18C

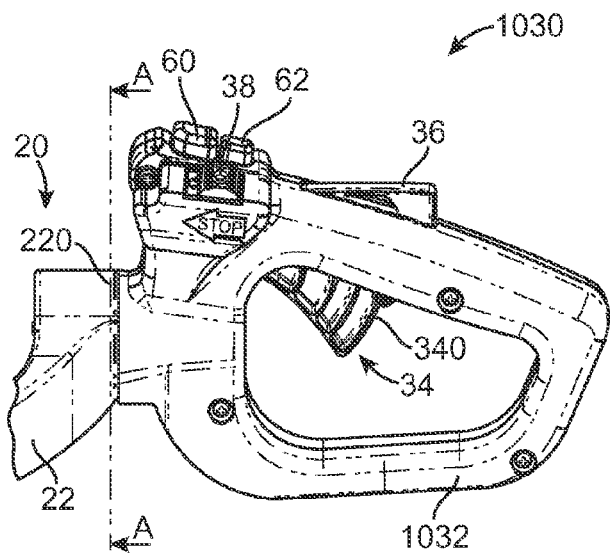
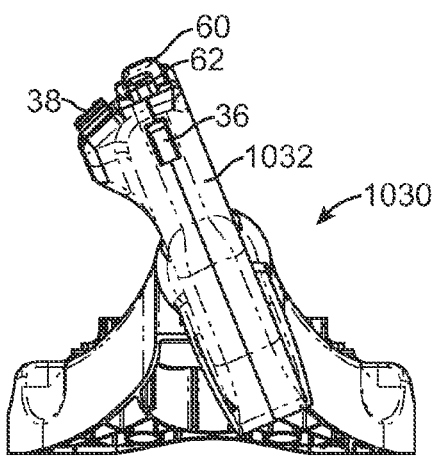
FIG. 21A  FIG. 21B
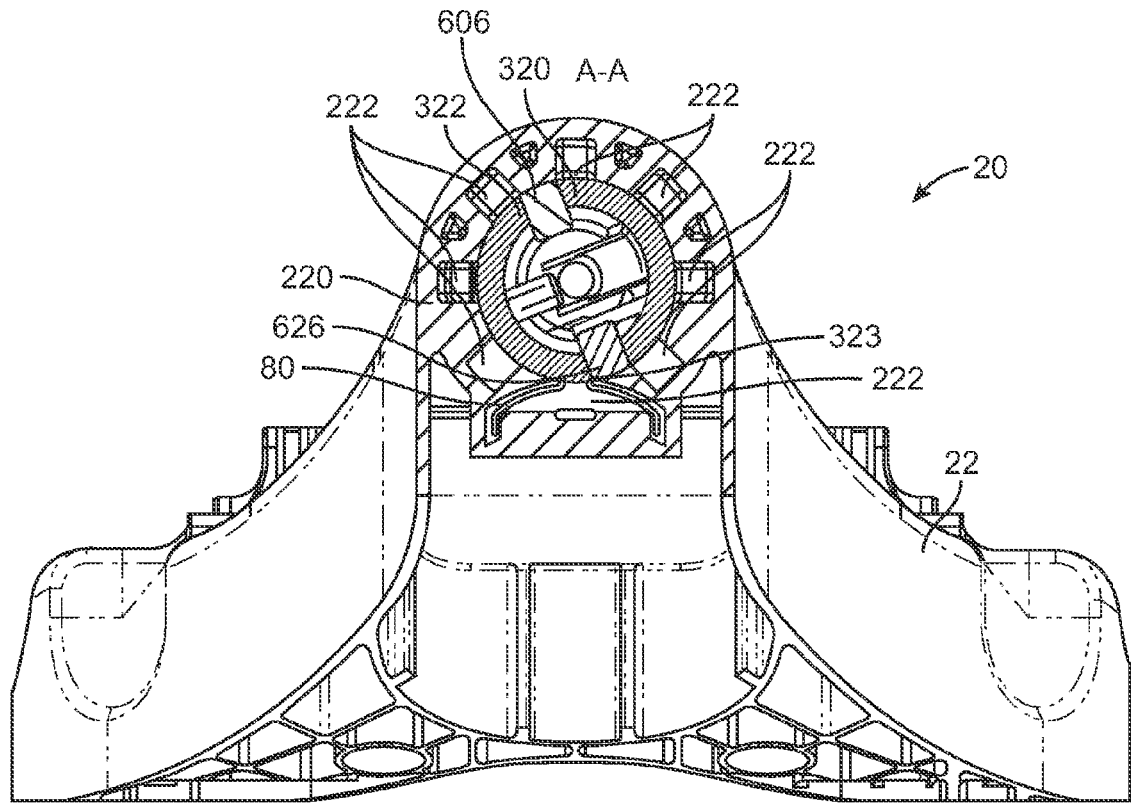
FIG. 21C

US 8,813,733 B2

HAND-HELD ENGINE-POWERED TOOL

CROSS-REFERENCE TO RELATED APPLICATION

This application claims the benefit of Japanese Patent Application 2008-316200, filed on Dec. 11, 2008, and Japanese Patent Application 2009-105732, filed on Apr. 23, 2009, the entire disclosures of which are incorporated by reference herein.

FIELD

This application relates generally to a hand-held engine-powered tool equipped with a handle that rotates about the main body of the tool.

BACKGROUND

In the past, engine-powered tools for trimming the foliage of hedges, etc., were ergonomically structured to allow angle alteration by rotating and setting the handle of the tool relative to the trimming position and the operator's stance. In addition, a structure that prevented the blade from moving was utilized in order to prevent inadvertent trimming of unintended locations when rotating the handle.

For example, Patent Literature 1 discloses art for locking the throttle lever immovable while the handle is in rotatable state. This is done by using a lever compound body connected to a protrusion that locks rotation of the handle by fitting into grooves provided in the tool body and a lever member of the throttle lever that abuts the throttle anchor lever.

Patent Literature 1: Unexamined Japanese Patent Application KOKAI Publication No. 2005-160303.

SUMMARY

In the art disclosed in Patent Literature 1, when the tool is in a rotatable state the protrusion that locks rotation of the handle is constantly spring-loaded in the locking direction by a spring. As a result, when there is a plurality of grooves capable of fitting the protrusion, the lock release operation must be executed multiple times or the rotation action must be executed while continually pulling the lock release lever in opposition to the spring's force, making smooth angle changes difficult to accomplish.

The present application addresses the above problem and seeks to attain a hand-held engine-powered tool that prevents operation of the cutting blade while the handle is rotatable and enables shifting between handle rotation and rotation locking through a simple operation. In order solve the above problem, the hand-held engine-powered tool according to a first embodiment of the present application is characterized by an engine having an ignition device. A body supports the engine. A handle is rotatably connected to the body. A limiting member anchors the handle to the body, limiting rotation of the handle. An operation unit provided on the handle regulates mixed gas supplied to the engine in accordance with the operating amount. And, a drive control device permits driving of the engine when the limiting member is limiting rotation of the handle, and stops driving of the engine when the limiting member permits rotation of the handle and the operation unit is in operating state. The drive control device may permit driving of the engine by supplying electric power for ignition to the ignition device of the engine and stop the engine by stopping the supply of electricity to the ignition device. The limiting member limits rotation of the handle when positioned in a first position, permits rotation of the handle when positioned in a second position and is provided with a first electrode terminal. The operation unit has a second electrode terminal that contacts the first electrode terminal when the operation unit is operated with the limiting member positioned at the second position. And, the drive control device stops the supply of electric power to the ignition device of the engine when the first electrode terminal and the second electrode terminal are in contact.

The limiting member may limit rotation of the handle when positioned in the first position and permit rotation of the handle when positioned in the second position. The limiting member has a limit release prevention unit that prevents the limiting member from changing from the first position to the second position when the operation unit is in operating state. The limit release prevention unit may be provided on the limiting member and is an engagement unit that engages with the operation unit by the limiting member moving toward the second position when the operation unit is in operating state. A rotational position determining unit may be further provided for determining the rotational position between the body and the handle.

The limiting member may be provided on the handle. The plurality of indentations may be provided in the body. And, the limiting member engages with each indentation to serve as the rotational position determining unit.

The handle may be further provided with a plurality of engagement stop holes with the same angular spacing as the angular spacing connecting the plurality of indentations provided on the body and the rotational axis of the handle. The body is further provided with engagement stop protrusions that engage with the engagement stop holes. And, the plurality of engagement stop holes and engagement stop protrusions engage when the indentations and limiting member are aligned.

A centrifugal clutch may further be provided between the engine and the blade driven by the engine, which interrupts the drive power to the blade when the engine falls below a predetermined number of revolutions.

According to another embodiment, a hand-held engine-powered tool comprises an engine. A body supports the engine. A handle is rotatably connected to the body. An operation lever is provided on the handle for regulating mixed gas supplied to the engine in accordance with the operating amount. A limiting device limits the rotation of the handle when positioned in a first position and permitting rotation of the handle when positioned in a second position. A first operation unit moves the limiting device from the first position to the second position. A second operation unit moves the limiting device from the second position to the first position wherein the first operation unit and second operation unit are provided adjacent to each other with substantially the same directions of operation. The first operation unit and second operation unit are provided on the side of the handle opposite to the side where the operation lever of the handle is provided. The first operation unit and second operation unit may be provided in an area where such can be operated by the thumb of the operator when the operator is gripping the handle. The first operation unit may be maintained in a state such that the limiting device is caused to move to the second position from the first position. An elastic member may be mounted on the handle and the limiting device receives an energizing force from the elastic member in the direction of the first position, and an engagement stop unit is provided for maintaining the limiting device in the second position, and the second operation unit releases the engagement stop of the engagement stop unit. The body may be provided with indentations that permit the limiting device to be in the first position, and the second operation unit can be operated only when the limiting device is aligned with the indentation.

A drive control device is may be provided which permits driving of the engine when the limiting device limits rotation of the handle and stops driving of the engine when the limiting device permits rotation of the handle and the operation lever is in operating state.

The drive control device may permit driving of the engine by supplying electric power for ignition to the ignition device of the engine, and stop the engine by stopping the supply of electricity to the ignition device. The limiting device may limit rotation of the handle when positioned in a first position, permit rotation of the handle when positioned in a second position and may be provided with a first electrode terminal; The operation lever has a second electrode terminal that contacts the first electrode terminal when the operation lever is in operating state with the limiting device positioned at the second position. The drive control device stops the supply of electric power to the ignition device of the engine when the first electrode terminal and the second electrode terminal are in contact.

A rotational position determining unit may be further provided for determining the rotational position between the body and the handle. The limiting device may be provided on the handle. The plurality of indentations may be provided in the body. The limiting member may engage with each indentation to serve as the rotational position determining unit. The handle may be further provided with a plurality of engagement stop holes with the same angular spacing as the angular spacing of the indentations in addition to the plurality of indentations provided in the body. The body is further provided with engagement stop protrusions that engage with the engagement stop holes. And, the plurality of engagement stop holes and engagement stop protrusions engage when the plurality of indentations and the limiting device are aligned.

A centrifugal clutch may be further provided between the engine and the blade driven by the engine, which interrupts the drive power to the blade when the engine falls below a predetermined number of revolutions.

According to another embodiment, a hand-held engine-powered tool comprises an engine. A body supports the engine. A handle is rotatably connected to the body. An operation lever is provided on the handle for regulating mixed gas supplied to the engine in accordance with the operating amount. A limiting device limits rotation of the handle when positioned in a first position and permitting rotation of the handle when positioned in a second position. A first operation unit enables the limiting device to move from the first position to the second position. And, a second operation unit for enabling the limiting device to move from the second position to the first position wherein the first operation unit and second operation unit are provided in an area where such can be operated by the thumb when the operator is gripping the handle.

As noted above, the hand-held engine-powered tool according to the embodiments disclosed in the present application can prevent operation of the blade when rotation of the handle is allowed. In addition, it is possible to readily switch between rotation of the handle and locking of the handle through a simple operation.

BRIEF DESCRIPTION OF THE DRAWINGS

A more complete understanding of this application can be obtained when the following detailed description is considered in conjunction with the following drawings, in which:

FIG. 16A is a top view of the engine-powered tool shown in FIG. 15;

FIG. 16B is a side view of the engine-powered tool shown in FIG. 15;

FIG. 18A is a side view of the engine-powered tool shown in FIG. 15 when the handle of the engine-powered tool is vertical;

FIG. 18B is a front view corresponding to FIG. 18A;

FIG. 18C is a cross-sectional view taken along line A-A in FIG. 18A;

FIG. 21A is a side view of the engine-powered tool shown in FIG. 15 when the handle of the engine-powered tool is in an inclined state;

FIG. 21B is a front view corresponding to FIG. 21A;

FIG. 21C is a cross-sectional view taken along line A-A in FIG. 21A;

DETAILED DESCRIPTION

Figure 1A:
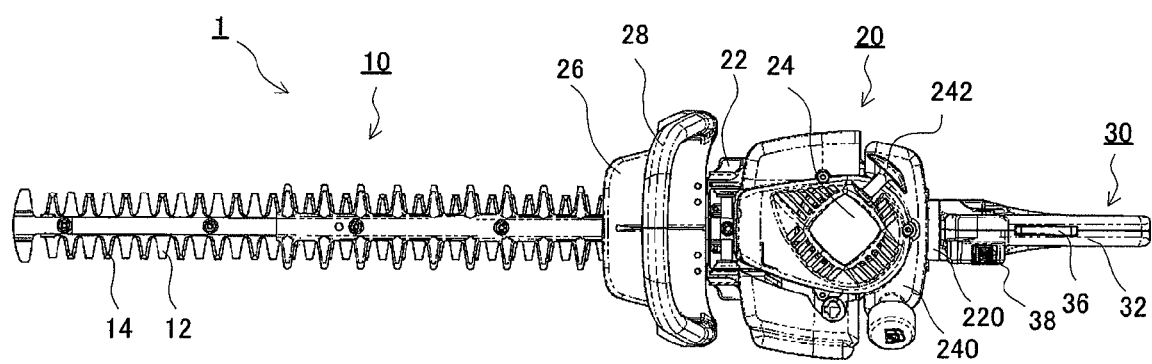
FIG. 1A is a top view of the hand-held engine-powered tool according to Embodiment 1.
Figure 1B:
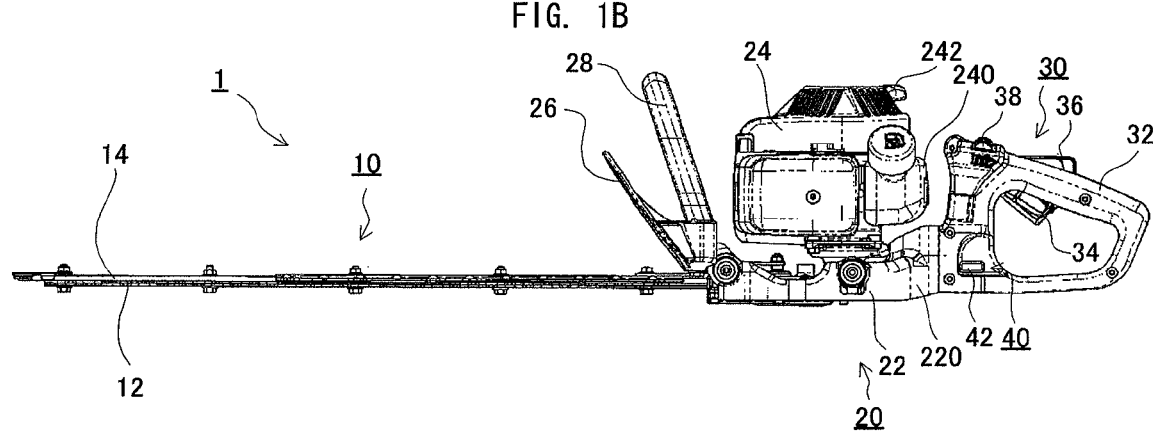
FIG. 1B is a side view of the engine-powered tool shown in FIG. 1A.

Embodiment 1 of the present invention will be described hereafter with reference to the drawings. The hand-held engine-powered tool (hereinafter, engine-powered tool) according to this Embodiment is primarily composed of a blade 10, a tool body (body) 20 and a rear handle 30, as shown in FIGS. 1A and 1B.

The blade 10 is composed of a lower blade 12 and an upper blade 14. Material positioned between the upper blade 14 and the lower blade 12 is trimmed when the later-described engine 24 moves the upper blade 14 and the lower blade 12 back and forth via a centrifugal clutch (not shown) and an eccentric cam (not shown).

Tool body 20 preferably has a support stand 22 and an engine 24. The engine 24 is preferably loaded on the support stand 22. A starter handle 242 is preferably formed which may be on the upper right of the engine 24 as shown in FIG. 1A. In addition, a fuel tank 240 is preferably formed on the right side as shown in FIG. 1A. Moreover, the support stand 22 preferably houses a centrifugal clutch (not shown) inside.

The centrifugal clutch transmits driving power to the lower blade 12 when the revolutions of the engine 24 increase, and interrupts power to the lower blade 12 when the revolutions of the engine 24 decrease. In addition, the lower blade 12 of the blade 10 alternates back and forth, via the centrifugal clutch, due to drive power generated by the engine 24. This back and forth motion trims material that an operator desires to trim. In addition, a hand guard 26 and a front handle 28 are preferably formed on the left side of the engine 24 on the support stand 22 as shown in FIG. 1A.

The hand guard 26 is intended to block cut material trimmed by the blade 10 from shooting towards the operator. The hand guard 26 is preferably roughly board-shaped and preferably extends from support stand 22 so as to protrude toward the upper left as shown in FIG. 1B.

The front handle 28 along with the later-described rear handle 30 are preferably provided to allow an operator to grip the engine-powered tool 1. The front handle 28 is preferably U-shaped and is preferably positioned above the hand guard 26 (as shown in FIG. 1B).

The rear handle 30 preferably has a handle body 32, a throttle lever (operation unit) 34, a safety lever 36, a stop switch 38 and a rotation lock member (limiting member) 40. A detailed disassembled diagram of the rear handle 30 is shown in FIG. 2.

Figure 2:
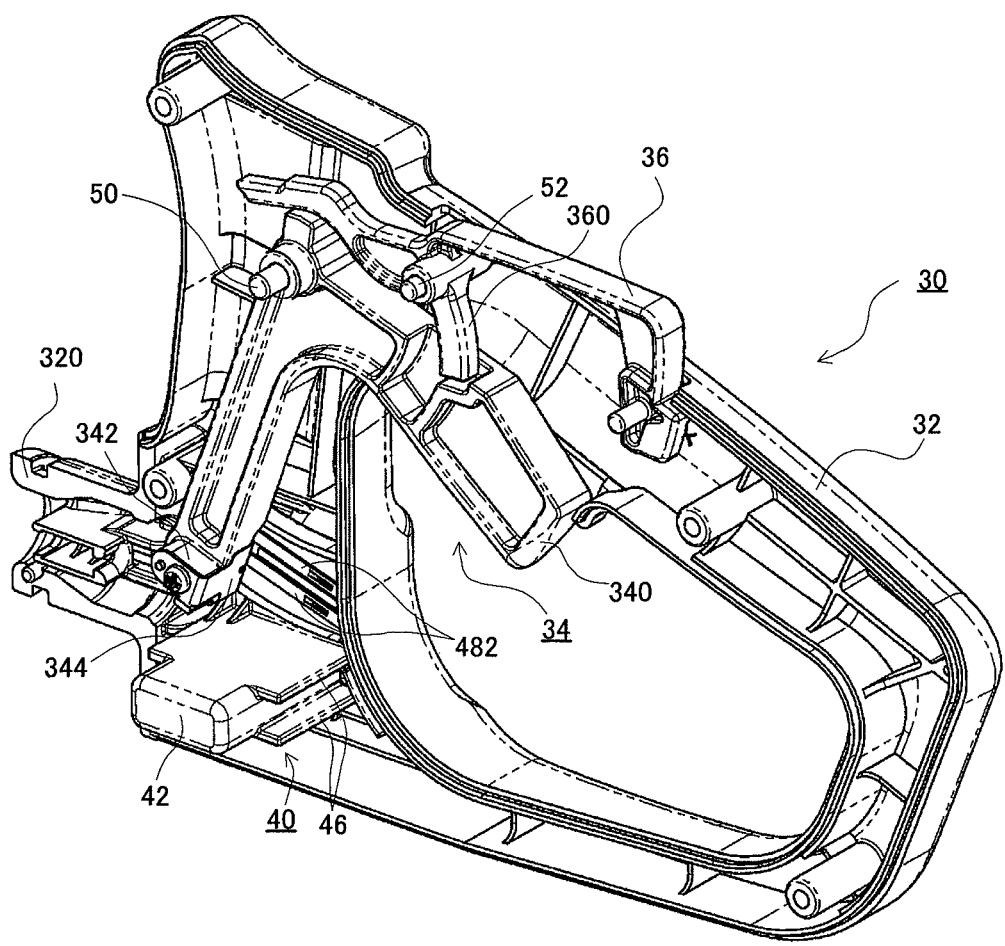
FIG. 2 is a disassembled view showing the inside of the operation unit of the engine-powered tool shown in FIG. 1A.

The handle body 32 along with the front handle 28 preferably allow gripping of the engine-powered tool 1, as shown in FIG. 2. The handle body 32 is preferably roughly D-shaped. In addition, the handle body 32 has formed in it a roughly cylindrical body connector 320 that preferably connects to the support stand 22.

The throttle lever 34 is preferably used to adjust the supply of mixed gas to the engine 24. The throttle lever 34 is preferably roughly L-shaped and preferably has a rotational axis 50 formed substantially at its center. As shown in FIG. 2, pulling on edge 340 of the throttle lever 34, which preferably protrudes within the handle body 32, in the counterclockwise direction forces the throttle lever 34 to rotate about the rotational axis 50 in the counterclockwise direction. The amount of mixed gas supplied to the engine 24 increases as the throttle lever 34 rotates further in the counterclockwise direction. In addition, when the throttle lever 34 is not pulled, the engine 24 is preferably idle with revolutions lower than that necessary for the centrifugal clutch (not shown) to interrupt transmission of drive power to the lower blade 12.

In addition, an electrode terminal (also called a drive control device or second electrode terminal) 344 is attached to the other edge 340 of the throttle lever 34. By making contact with the electrode terminal 344 to a later-described electrode terminal 482 (also called a drive control device of the first electrode terminal), the supply of electric power to a later-described ignition device 246 is stopped. The function of the electrode terminal 344 will be described hereafter with reference to FIG. 9.

Figure 3A:
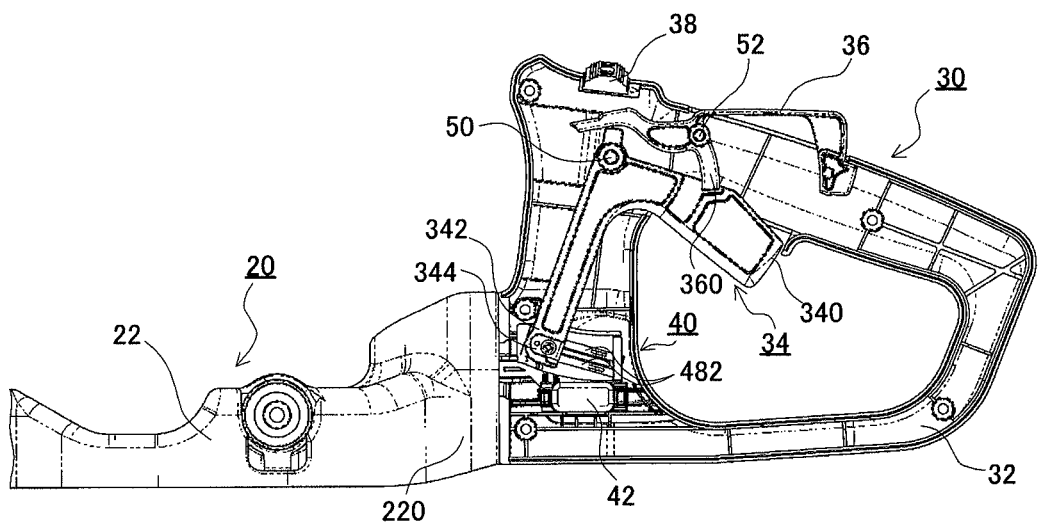
FIG. 3A is a partial cross-sectional side view of the throttle lever lock state of the engine-powered tool shown in FIG. 1A.
Figure 3B:
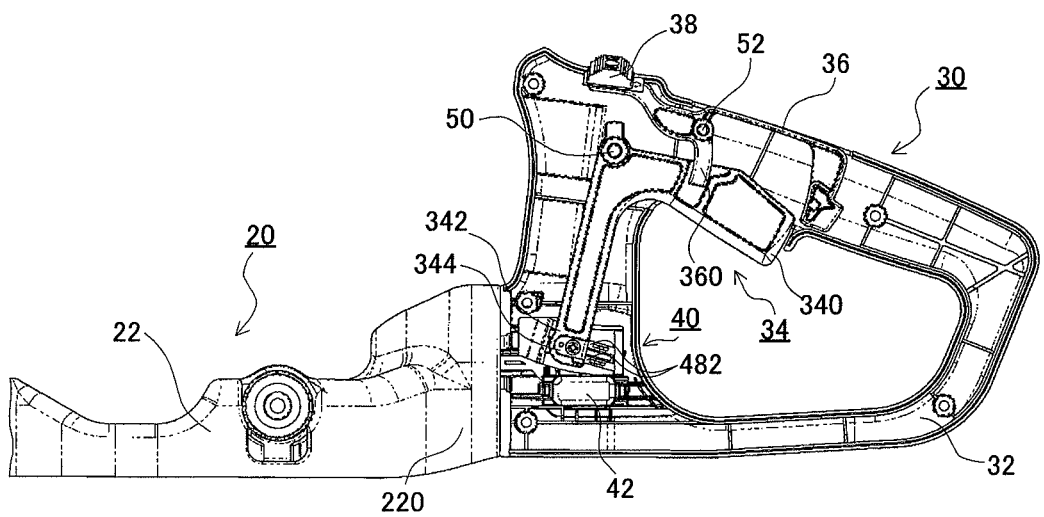
FIG. 3B is a partial cross-sectional side view of the throttle lever unlock state of the engine-powered tool shown in FIG. 1A.

The safety lever 36 preferably limits inadvertent triggering of the throttle lever 34. The safety lever 36 preferably has a rotational axis 52 in its center and preferably has a protrusion 360 extending downward from the rotational axis 52, as shown in FIGS. 3A and 3B. In the state shown in FIG. 3A in which the safety lever 36 is mostly outside the handle body 32, the protrusion 360 of the safety lever 36 abuts the throttle lever 34, restricting counterclockwise movement of the throttle lever 34. In contrast, the state shown in FIG. 3B depicts the safety lever 36 rotated clockwise about the rotational axis 52, which separates the protrusion 360 of the safety lever 36 from the throttle lever 34, allowing counterclockwise movement of the throttle lever 34.

The stop switch 38 is preferably on top of the handle body 32 as shown in FIG. 3A. The stop switch 38 preferably ceases the supply of electric power to the later-described ignition device 246. The detailed functions of the stop switch will be described hereafter with reference to FIG. 9.

Figure 6A:
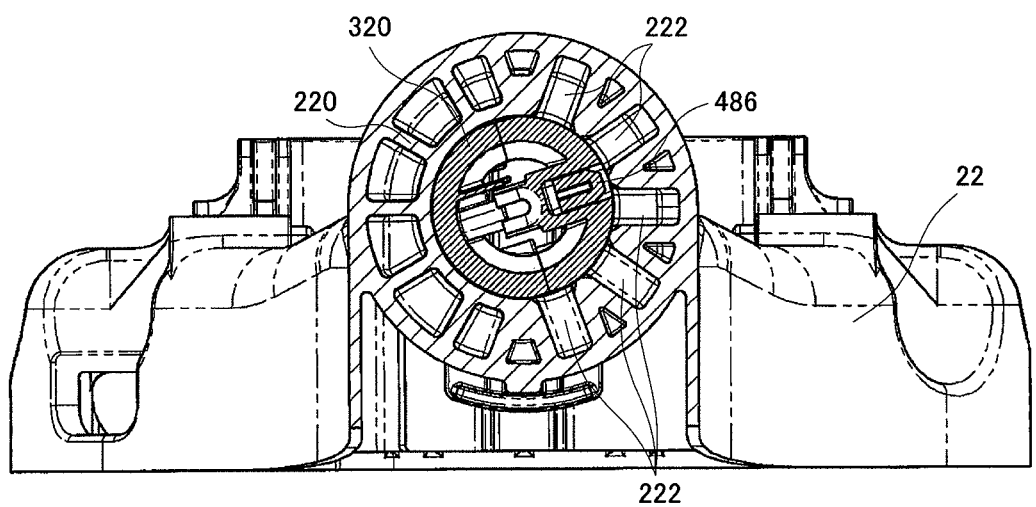
FIG. 6A is a cross-sectional view taken along line A-A in FIG. 5A.
Figure 6B:
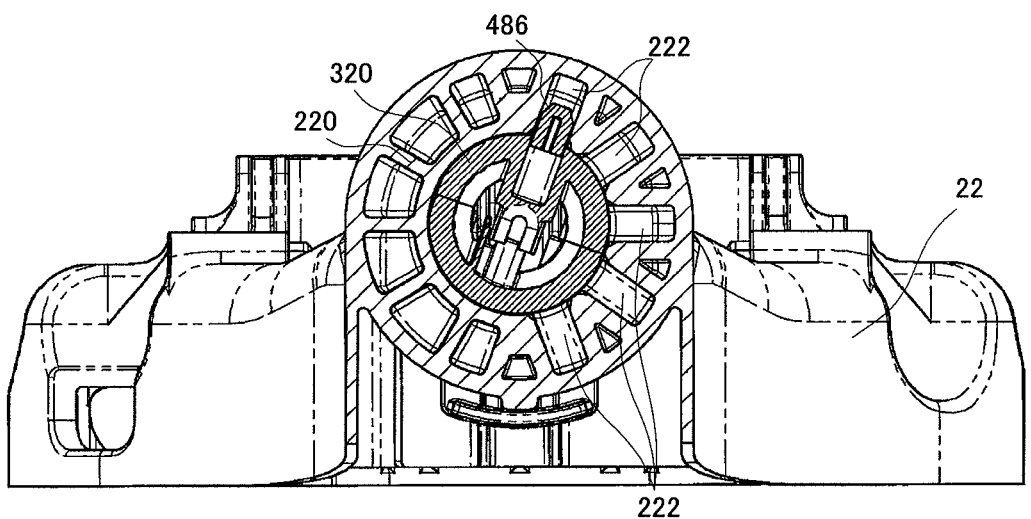
FIG. 6B is a cross-sectional view taken along line A-A in FIG. 5C.
Figure 7A:
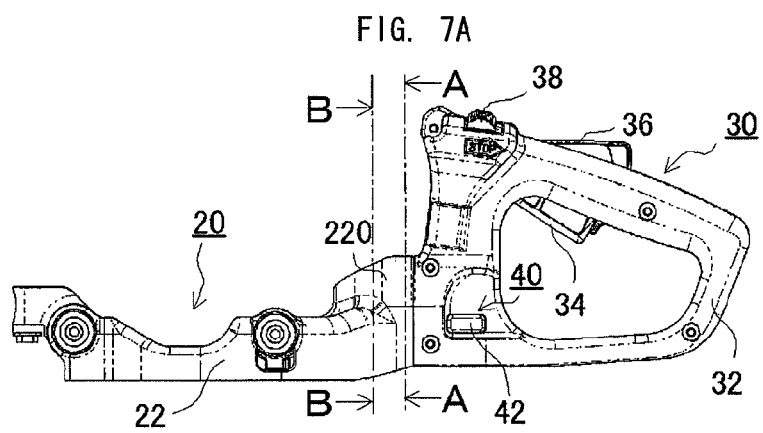
FIG. 7A is a side view showing a handle rotation state of the engine-powered tool shown in FIG. 1A.
Figure 7B:
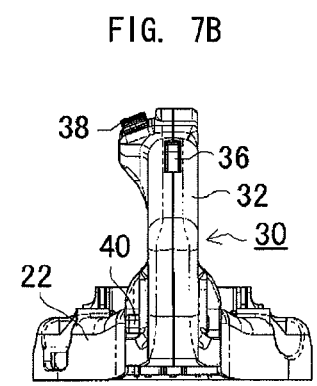
FIG. 7B is a front view corresponding to FIG. 7A.
Figure 7C:
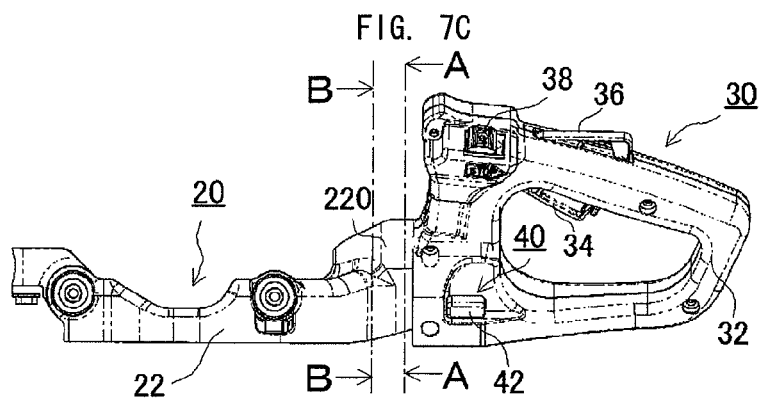
FIG. 7C is a side view showing a handle rotation state differing from that of FIG. 7A of the engine-powered tool shown in FIG. 1A.
Figure 7D:
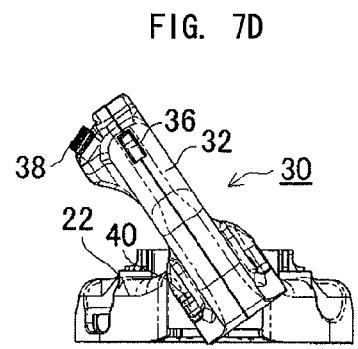
FIG. 7D is a front view corresponding to FIG. 7C.

The rotation lock member 40 is preferably inside the rear handle 30 preferably near support stand 22. The rotation lock member 40 preferably includes a slide body 41 preferably in the shape of a rectangular solid, a terminal supporter 48 that perpendicularly intersects slide body 41, and an engagement stop protrusion (rotational position determining unit) 486 that engages with the later-described press insertion indentations (rotational position determining unit) of support stand 22. These features are shown in FIGS. 6A-6B of support stand 22, and are shown enlarged in FIGS. 4A-4B.

The slide body 41 preferably has rubbing parts 46 capable of rubbing on the handle body 32 preferably on both side surfaces preferably roughly orthogonal to the side surface of the handle body 32, enabling reciprocating movement of the rotation lock member 40 in the rear handle 30.

Figure 4A:
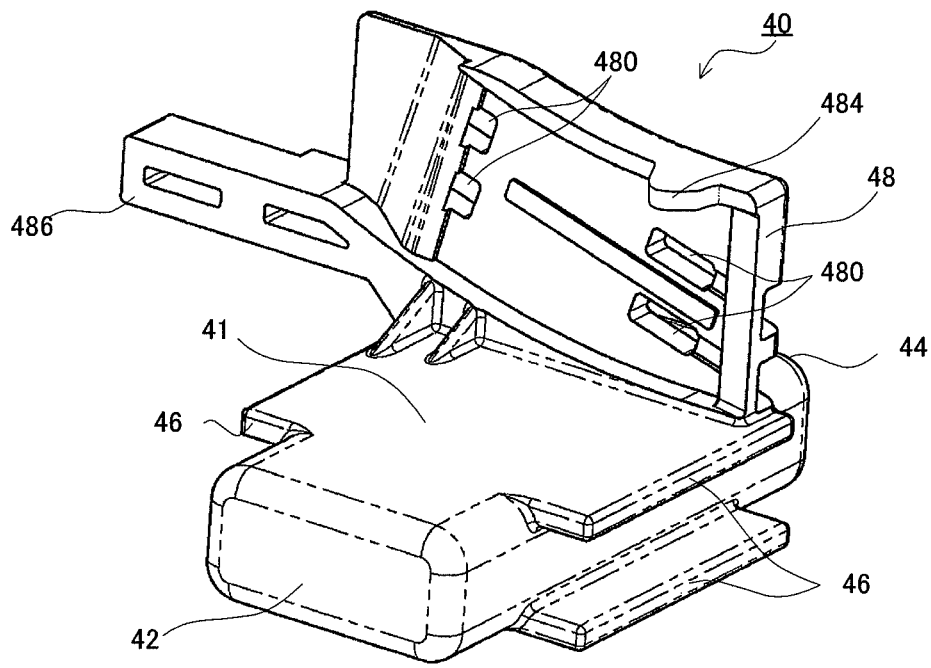
FIG. 4A is an oblique view of one side of the rotation lock member of the engine-powered tool shown in FIG. 1A.
Figure 4B:
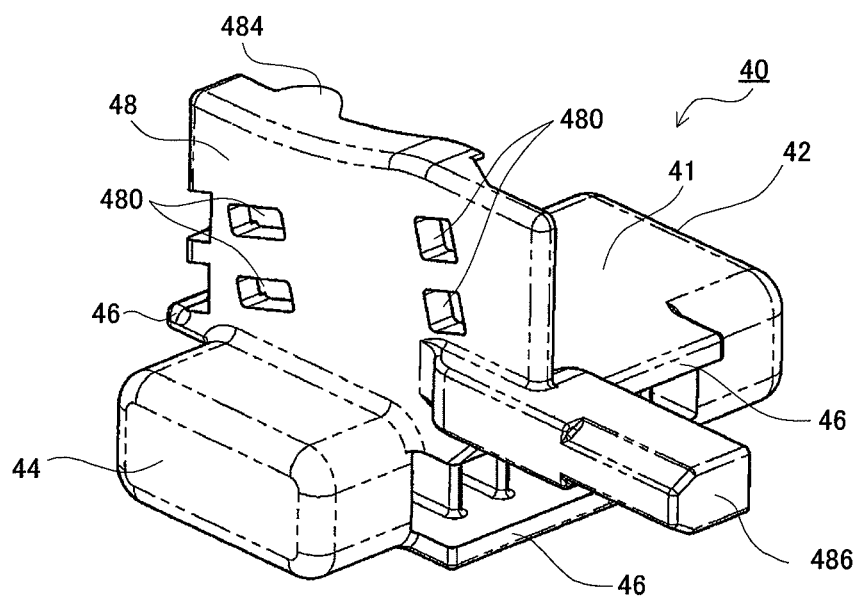
FIG. 4B is an oblique view of the opposite side of the rotation lock member shown in FIG. 4A.
Figure 5A:
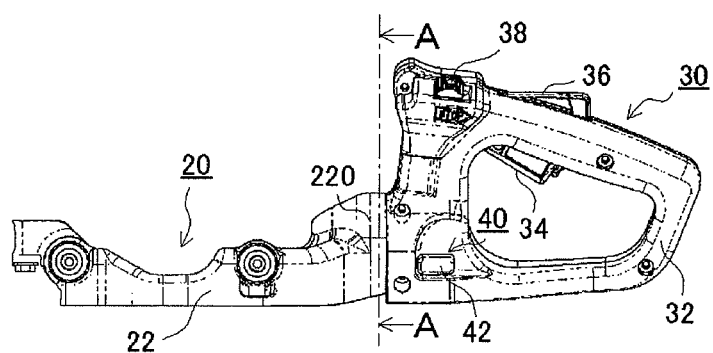
FIG. 5A is a side view showing the handle rotation state of the engine-powered tool shown in FIG. 1A.
Figure 5B:
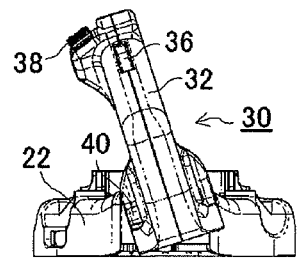
FIG. 5B is a front view corresponding to FIG. 5A.
Figure 5C:
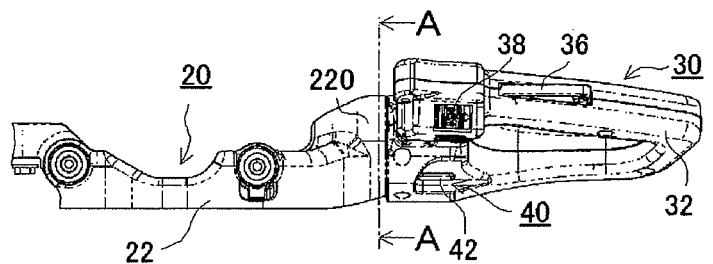
FIG. 5C is a side view showing a handle rotation state differing from that of FIG. 5A of the engine-powered tool shown in FIG. 1A.
Figure 5D:
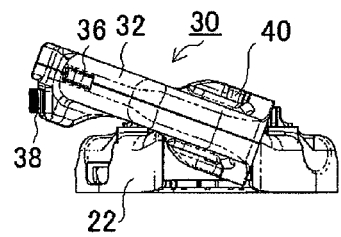
FIG. 5D is a front view corresponding to FIG. 5C.

Support holes 480 for supporting the electrode terminal 482 shown in FIGS. 2, 3A and 3B are preferably formed in the terminal supporter 48. By making contact with the electrode terminal 482 to the electrode terminal 344 formed in the throttle lever 34, the electrode terminal 482 stops the supply of electric power to the later-described ignition device 246. The functions of the electrode terminal 482 will be described further below with reference to FIG. 9. In addition, protrusion 484 (limiting release prevention parts or engagements) is preferably integrated with the top of terminal supporter 48, as shown in FIGS. 4A and 4B. Detailed operation of the protrusions 484 will be explained hereafter.

The press insertion protrusion 486 extends toward the handle connector 220 provided in the tool body 20 as shown in FIGS. 3A and 3B, roughly on the same plane as the terminal supporter 48. In addition, in the tool body 20, press insertion indentations 222 (see FIGS. 6A and 6B), which preferably engages with the press insertion protrusion 486, are preferably positioned on the handle connector 220, which is preferably operably connected to the rear handle 30. The press insertion protrusion 486 preferably engages with the press insertion indentations 222 provided in the handle connector 220 of the support stand 22 and anchor the rear handle 30 to the support stand 22.

The preferred operation of the rotation lock member 40 that preferably locks rotation of the rear handle 30 will be described hereafter with reference to FIGS. 5A, 5B, 5C, 5D, 6A and 6B.

In the handle connector 220 according to this embodiment, the press insertion indentations 222 into which the press insertion protrusion 486 preferably engages are preferably positioned in five locations centered about the rotational axis, with a spacing of preferably approximately 35° each. The operator rotates the rear handle 30. When the press insertion protrusion 486 is positioned at an angle facing a given press insertion indentation 222, the operator pushes the side surface 42 (hereafter referred to as the fixed side surface) to the throttle lever 34 side of the slide body 41 shown in FIGS. 4A and 4B. This causes the side surface 44 (hereafter called the anchor release side surface) on the terminal supporter 48 side of the slide body 41 to protrude from the side surface of the handle body 32. Accordingly, the press insertion protrusion 486 engages with a press insertion indentation 222 and rotation of the rear handle 30 is locked.

Conversely, when the anchor release side surface 44 is pushed, the anchor side surface 42 preferably protrudes from the side surface of the handle body 32. Accordingly, the press insertion protrusion 486 is disengaged from the press insertion indentation 222, enabling the rear handle 30 to rotate.

Figure 8A:
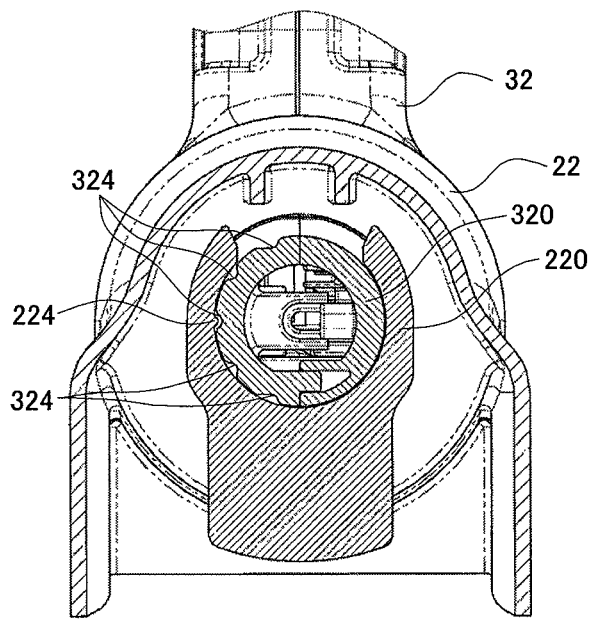
FIG. 8A is a cross-sectional view taken along line B-B in FIG. 7A.
Figure 8B:
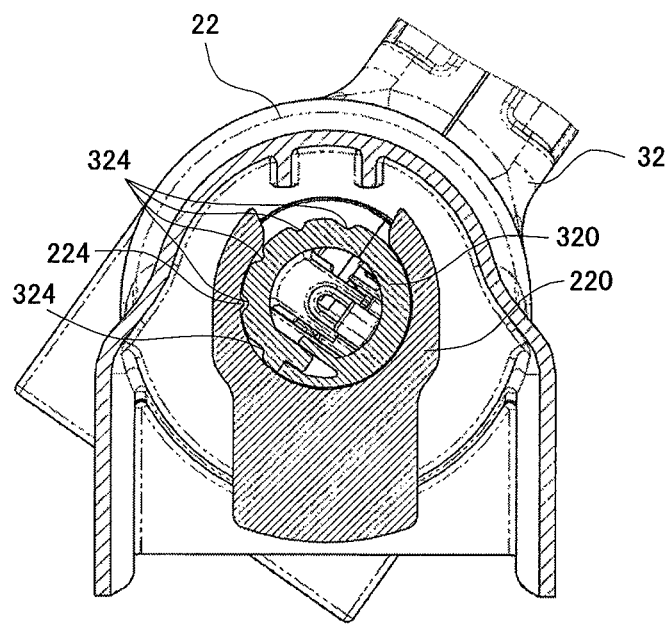
FIG. 8B is a cross-sectional view taken along line B-B in FIG. 7C.

The structure that signals the operator that the press insertion protrusion 486 is positioned at an angle facing a press insertion indentation 222 when rotating the rear handle 30 will be described hereafter with reference to FIGS. 7A, 7B, 7C, 7D, 8A and 8B. An engagement stop protrusion 224 is preferably formed in one location on the handle connector 220 provided on the support stand 22, as shown in FIGS. 8A and 8B. Furthermore, engagement stop holes 324, which are adapted to engage with the engagement stop protrusion 224, are preferably formed in five locations at approximately 35° intervals about the axis of rotation on the body connector 320 of the handle body 32.

The engagement stop holes 324 are preferably formed with the same angular spacing as the press insertion indentations 222 so that the press insertion protrusion 486 and the press insertion indentation 222 are aligned when the engagement stop protrusion 224 engages with an engagement stop hole 324, as shown in FIGS. 6A and 6B. In this manner, the resistance and the sound made when stop protrusion 224 engages with an engagement stop hole 324, signals the operator that the press insertion protrusion 486 is aligned with a press insertion indentation 222. Accordingly, upon being signaled that an angle at which the rear handle 30 can be anchored was located, the operator can engage the press insertion protrusion 486 and a press insertion indentation 222 by pushing the fixed side surface of the rotational lock member 40, making anchoring of the rear handle 30 seamless. As would be understood by one of ordinary skill in the art, the number and angle of the engagement stop holes 324 and press insertion indentations 22 may be arbitrarily changed in accordance with the specifications targeted.

Supplying of electric power to the sparkplug 248 in the engine 24 will be described hereafter with reference to FIG. 9. Supplying of electric power to the sparkplug 248 is preferably attained through an engine generator 244 that generates electricity through the power of the engine 24, and an ignition device 246 preferably electrically connected to a terminal of engine generator 244. Engine operator 244 impresses an ignition voltage on the sparkplug 248. Next, the stop switch 38 is preferably made up of an opening and closing switch and is preferably electrically connected between two output terminals of engine generator 244. When stop switch 38 is closed, the two output terminals of engine generator 244 are short-circuited. Consequently, the supply of electric power for ignition to the ignition device 246 from the engine generation 244 is halted and the supply of electric power to the sparkplug 248 from the ignition device 246 is halted.

The electrode terminal 344 is preferably formed on the throttle lever 34 and is preferably connected to one of the output terminals of the engine generator 244, and in addition, the electrode terminal 482 provided on the rotation lock member 40 is preferably electrically connected to the other output terminal of the engine generator 244. The electrode terminal 344 positioned on the other end 342 of the throttle lever 34 preferably makes contact with the electrode terminal 482, which is triggered by the operation of the throttle lever 34, so that the two output terminals of the engine generator 244 are short-circuited. As a result, the supply of electric power for ignition to the ignition device 246 from the engine generation 244 is halted and the supply of electric power to the sparkplug 248 from the ignition device 246 is halted.

Figure 10A:
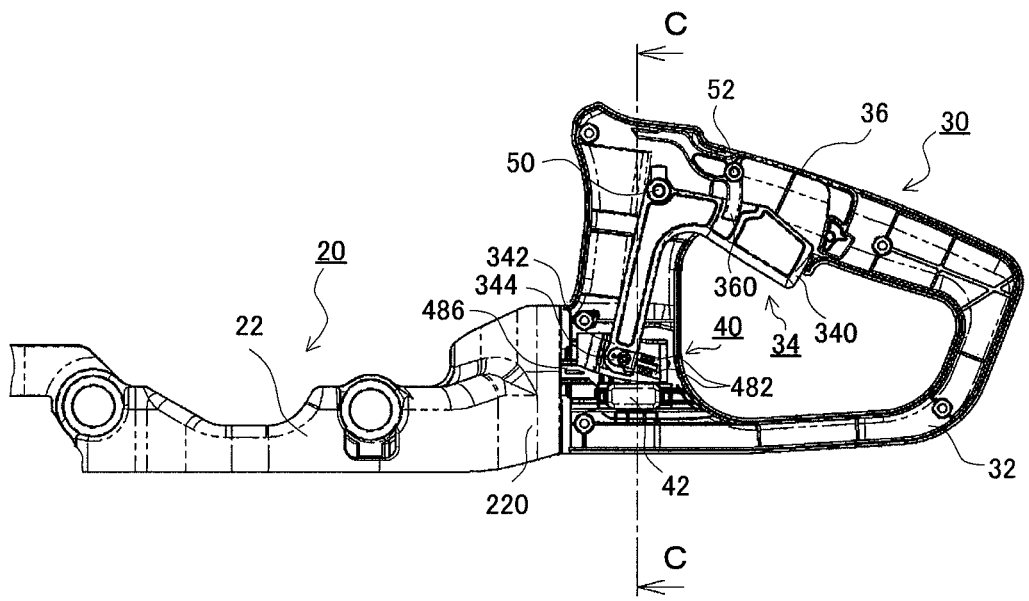
FIG. 10A is a partial cross-sectional view of the engine-powered tool shown in FIG. 1A.

The engine halt operation triggered when the throttle lever 34 is pulled with the rear handle 30 in a rotatable state will be described hereafter with reference to FIGS. 10A, 10B, 11A and 11B. FIG. 10A shows the state with the rotation lock member 40 positioned in a rotatable position and the throttle lever 34 pulled.

Figure 10B:
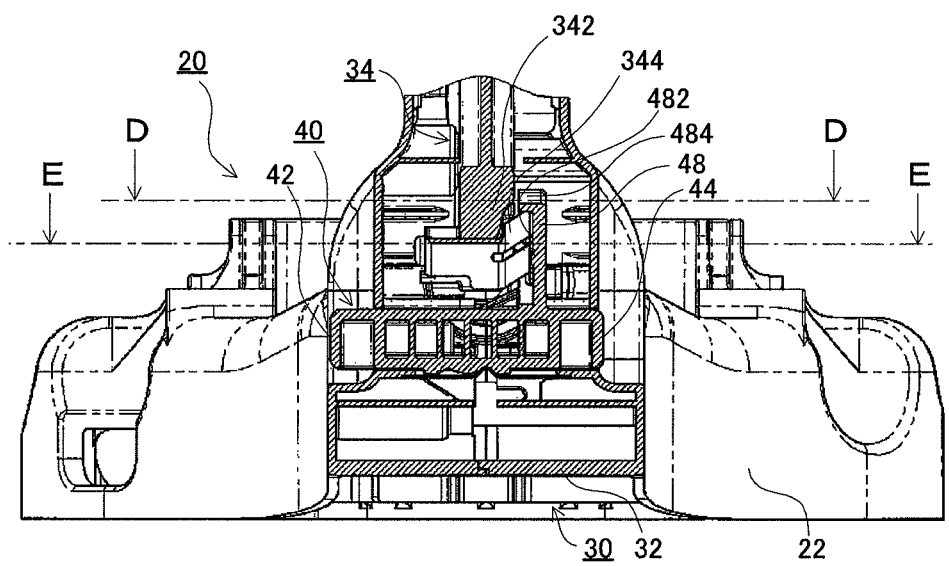
FIG. 10B is a cross-sectional view taken along line C-C in FIG. 10A.
Figure 11A:
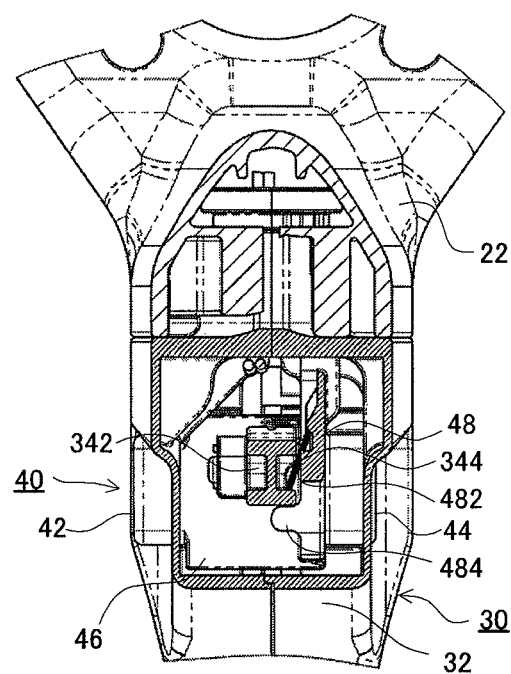
FIG. 11A is a cross-sectional view taken along line D-D in FIG. 10B.
Figure 11B:
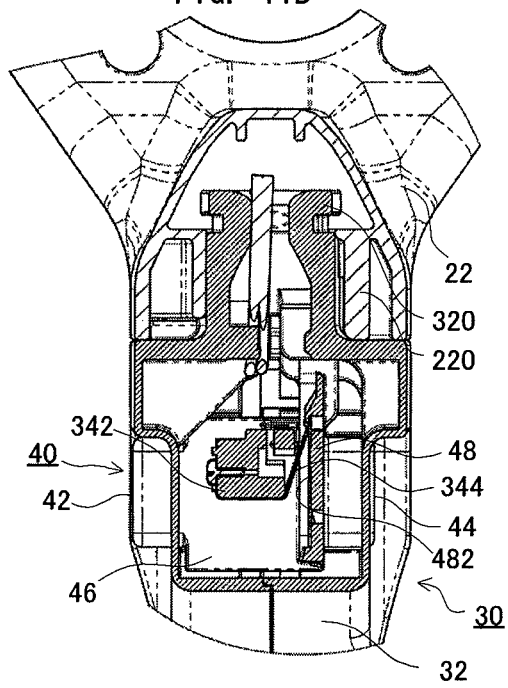
FIG. 11B is a cross-sectional view taken along line E-E in FIG. 10B.

When the anchor release side surface 44 of the rotation lock member 40 is pushed, the press insertion protrusion 486 is preferably released from the press insertion indentation 222 and the rear handle 30 becomes rotatable. At the same time, the terminal support member 48 of rotation lock member 40 preferably moves near the throttle lever 34, as shown in FIGS. 10B, 11A and 11B. When the operator pulls one edge 340 of the throttle lever 34 shown in FIG. 10A into the handle body 32, the throttle lever 34 preferably rotates about the axis of rotation 50. At this time, the electrode terminal 344 on the other end 342 of the throttle lever 34 makes contact with the electrode terminal 482, which is preferably on terminal support unit 48 of the rotation lock member 40, as shown in FIGS. 10B, 11A and 11B.

Figure 9:
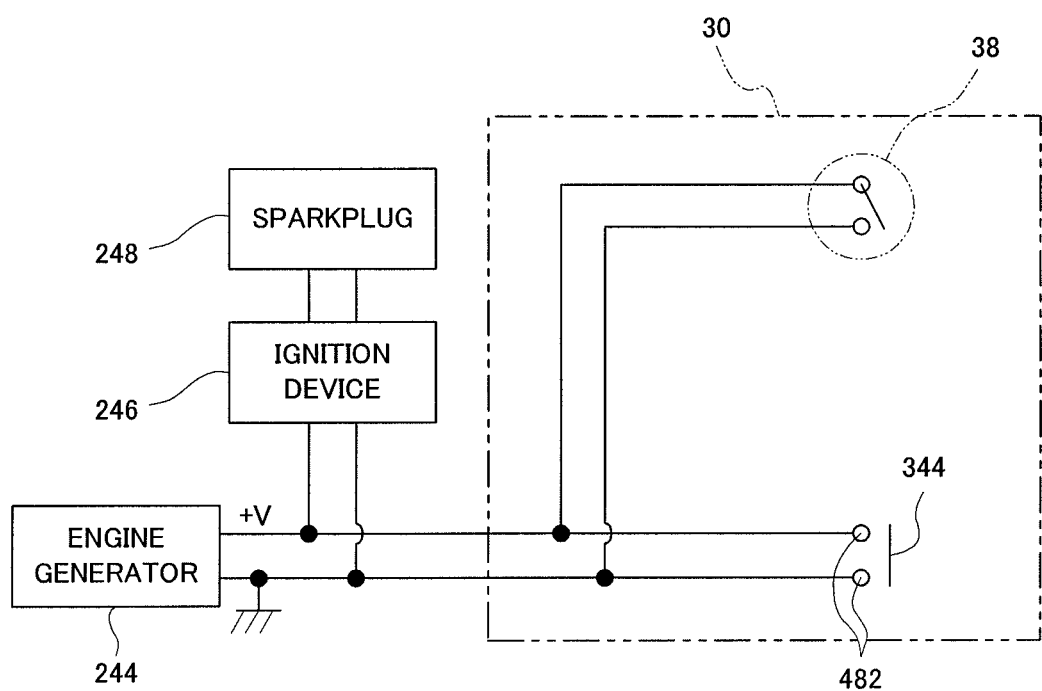
FIG. 9 is a circuit diagram relating to the electrode terminals provided in the throttle lever and rotation lock member of the engine-powered tool shown in FIG. 1A.

In this manner, when the electrode terminal 344 contacts the electrode terminal 482, the two output terminals of the engine generator 244 are short-circuited, as shown in FIG. 9. Consequently, the supply of electric power to the ignition device 246 from the engine generator 244 is halted and the supply of electric power to the sparkplug 248 from the ignition device 246 is halted. As a result, the action of the piston inside the engine 24 stops.

In addition, although the terminal support unit 48 of the rotation lock member 40 is positioned near the throttle lever 34, the position of the terminal 344 and the electrode terminal 482 is not affected; therefore, pulling of the throttle lever 34 is still necessary in order for the terminal 344 and the electrode terminal 482 to contact each other. Consequently, if the throttle lever 34 is not pulled, the engine 24 enters an idling state in which the drive power of the engine 24 does not flow to the blade 10, so the operator can rotate the rear handle 30 without stopping the engine 24.

Figure 12A:
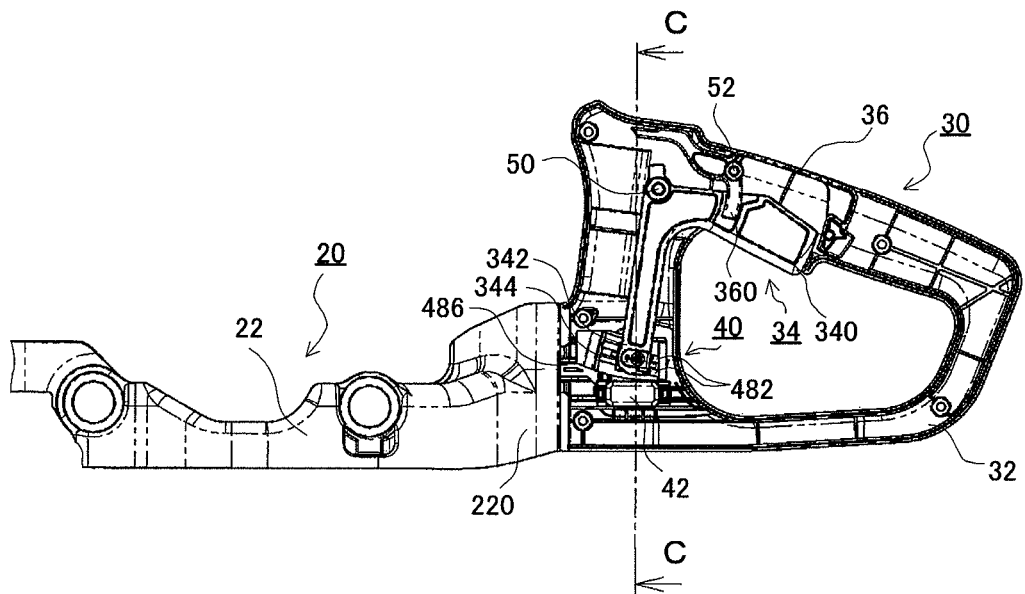
FIG. 12A is a partial cross-sectional view of the engine-powered tool shown in FIG. 1A.
Figure 12B:
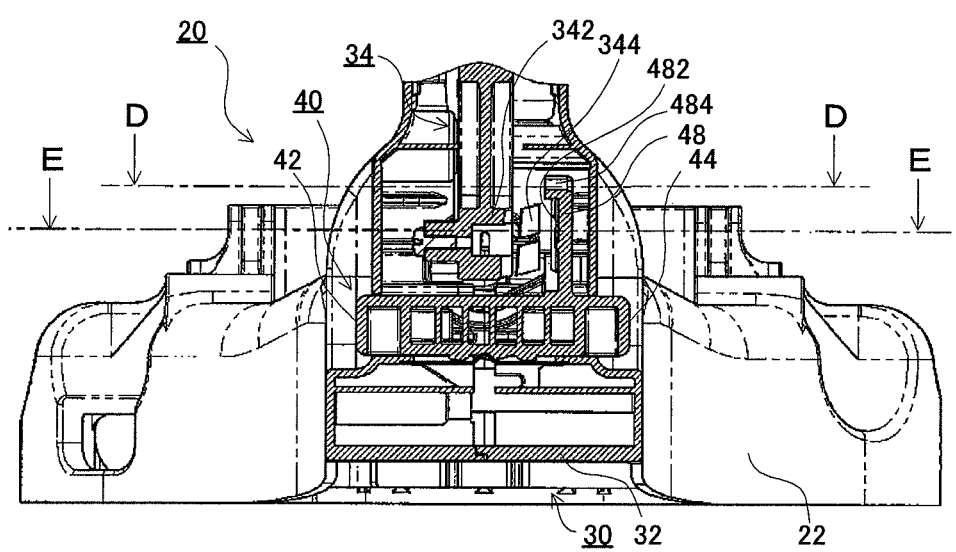
FIG. 12B is a cross-sectional view taken along line C-C in FIG. 12A.

The structure for preventing the switch from entering a state in which the rotation lock member 40 limits the rotation of the rear handle 30, while the throttle lever 34 is pulled (the operating state of the engine-powered tool 1) to a position in which the rotation lock member 40 permits rotation of the rear handle 30 is described hereafter with reference to FIGS. 12A, 12B, 13A and 13B. FIG. 12A, which show anchor release side surface 44 of the rotation lock member 40 in a pressed state after the rotation lock member 40 is positioned at the rotation lock position and the throttle lever 34 is pulled.

Figure 13A:
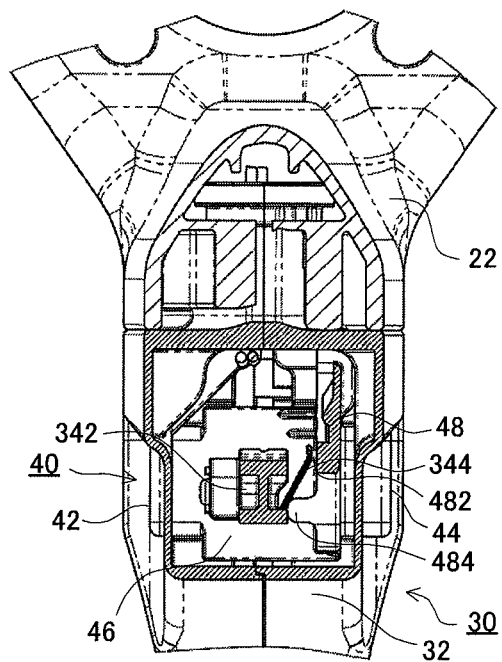
FIG. 13A is a cross-sectional view taken along line D-D in FIG. 12B.
Figure 13B:
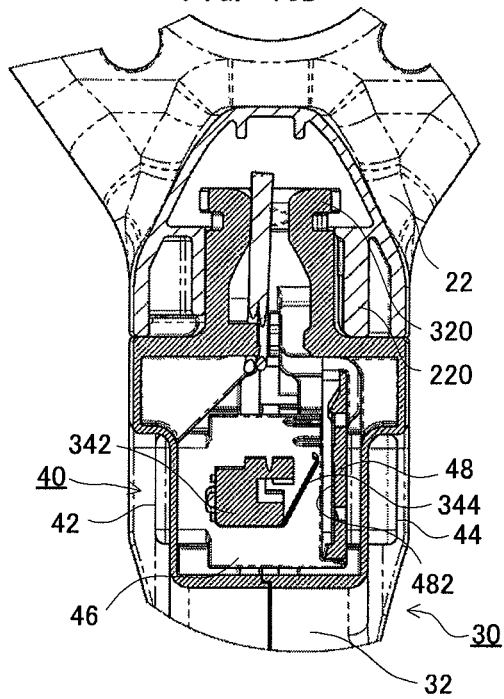
FIG. 13B is a cross-sectional view taken along line E-E in FIG. 12B.

In this state, when the operator presses the anchor release side surface 44 of the rotation lock member 40, the protrusion 484 provided on the terminal support unit 48 as shown in FIG. 13A makes contact with the other end 342 of the throttle lever 34. As a result, the press insertion protrusion 486 shown in FIGS. 6A and 6B provided on the rotation lock member 40 cannot be disengaged from the press insertion indentation 222, so the rotation lock of the rear handle 30 is not released. In this manner, the protrusion 484 acts as a limit release prevention unit, so the change to a rotatable state from the state in which rotation of the rear handle 30 is locked and the throttle lever 34 has been pulled can be prevented.

A variation on the rotation lock member 40 having a function preventing the change from a state in which the rotation lock member 40 limits rotation of the rear handle 30 while the throttle lever 34 is pulled (the operation state of the engine-powered tool 1) to a state in which the rotation lock member 40 permits rotation of the rear handle 30 will be described hereafter with reference to FIGS. 14A, 14B and 14C.

The throttle lever 34 according to this embodiment preferably has, on the other end 342, an engagement protrusion 346 (limit release prevention unit, engagement) that protrudes toward the rotation lock member 40. Furthermore, according to this embodiment, in the slide body 41 of the rotation lock member 40, a receiving hole 412 is preferably formed at a position that is aligned with the engagement protrusion 346 in a rotation release state (the state positioned to the left edge as shown in FIGS. 14A and 14B).

The action of the throttle lever 34 and the rotation lock member 40 according to this embodiment will be described hereafter. First, rotation lock member 40 is preferably positioned in a rotatable position as shown in FIG. 14A, and when the throttle lever 34 is pulled as shown in FIG. 14B, the other end 342 is positioned below. When this occurs, the electrode terminal 344 and the electrode terminal 482 preferably make contact, short-circuiting the two output terminals of the engine generator 244. As a result, the supply of electric power to the ignition device 246 from the engine generator 244 is halted and the supply of electric power to the sparkplug 248 from the ignition device 246 is halted. At this time, because a receiving hole 412 is formed in the slide body 41, there is no interference between the engagement protrusion 346 and the surface of the slide body 41.

Figure 14A:
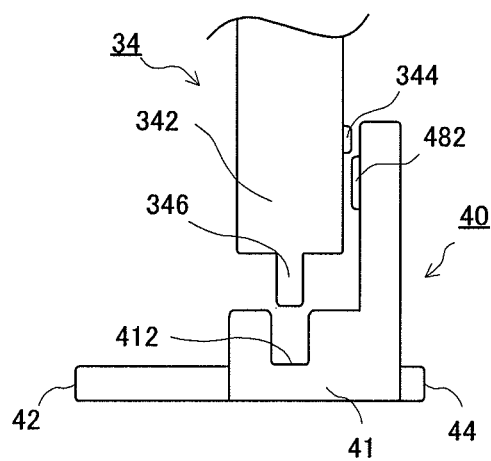
FIG. 14A shows the handle rotatable state of a variation of the throttle lever and rotation lock member of the engine-powered tool shown in FIG. 1A.
Figure 14B:
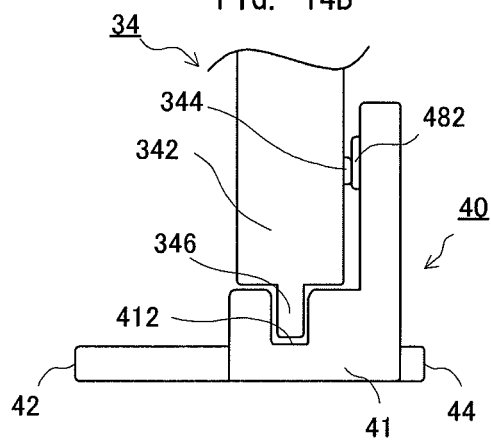
FIG. 14B shows the state with the throttle lever pulled in FIG. 14A.
Figure 14C:
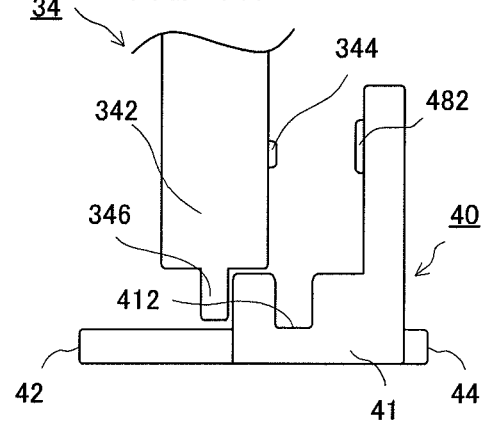
FIG. 14C shows the state with the throttle lever pulled in a rotation lock state in FIG. 14A.

FIG. 14C shows rotation lock member 40 positioned at the rotation lock position (the position on the right side of the position of the rotation lock member 40 in FIG. 14A). In FIG. 14C throttle lever 34 has been pulled and the other end 342 is positioned at the bottom. In this state, even if the anchor release side surface 44 is pressed so that the rotation lock member 40 moves to a rotatable position (the left side of the position of the rotation lock member 40 in FIG. 14C), the engagement protrusion 346 interferes with the side surface of the slide body 41, preventing the rotation lock member 40 from moving to the rotatable position. In this manner, the engagement protrusion 346 acts as a limit release prevention unit. Thus, rotation of the rear handle 30 is locked and a change to a rotatable state is prevented when the throttle lever 34 is in a pulled state.

The engine-powered tool 1 according to the above embodiments preferably stops powering of the engine 24 when the throttle lever 34 is pulled while rotation of the rear handle 30 is permitted, thereby preventing inadvertent trimming of an unintended location while rotating the rear handle 30.

Specifically, it is possible to stop the engine 24 by stopping the supply of electric power to the ignition device 246 of the engine 24.

More specifically, if the throttle lever 34 is pulled while the rotation lock member 40 permits rotation of the rear handle 30, the electrode terminal 482 preferably formed on the rotation lock member 40 preferably makes contact with the electrode terminal 344 preferably provided on the throttle lever 34. Through this contact, the output terminals of the engine generator 244 are short-circuited, stopping the supply of electric power to the sparkplug 248. Through this, it is possible to prevent the blade 10 from operating during rotation of the rear handle 30.

In addition, by endowing the rotation lock member 40 with a protrusion 484 and an engagement protrusion 346, when the rotation lock member 40 limits the rotation of the rear handle 30 and the throttle lever 34 is pulled, the rotation lock member 40 is prevented from moving to a position that permits rotation of the rear handle 30.

Furthermore, by providing a plurality of press insertion indentations 222 in the handle connector 220 of the tool body 20 so as to align with press insertion protrusion 486 of the rotation lock member 40, it is possible to anchor the rear handle 30 to the tool body 20 at an angle corresponding to a location where an engageable indentation 222 is provided.

Furthermore, an engagement stop protrusion 224 is provided in a set location on the handle connector 220, which is preferably provided on the support stand 22, and a plurality of engagement stop holes 324 are preferably provided in the body connector 320 of the handle body. When the rear handle 30 is rotated, the operator is signaled when the angle suitable for anchoring the rear handle 30 is found, when the engagement stop position, between the engagement stop protrusion 224 and an engagement stop hole 324, matches the position where the press insertion protrusion 486 and a press insertion indentation 222 are aligned. After the operator is signaled of a possible angle suitable for anchoring the rear handle 30, the rear handle 30 can be anchored by pressing on the anchor side surface of the rotation lock member 40, allowing the press insertion protrusion 486 to engage easily with press insertion indentation 222.

Furthermore, by providing a centrifugal clutch (not shown), it is possible to rotate rear handle 30 while the engine 24 is idle without the operation of blade 10. By so doing, it is possible to swiftly restart operation after the rear handle 30 has been rotated to a desired angle.

The present application is not limited to the trimmer described in the disclosed embodiments, and can be applied to cutters or saws.

In addition, the present application depicts arrangements short-circuiting the output terminals of the engine generator 24 and interrupting electric power supplied to the sparkplug 248 by having the electrode terminal 482 preferably formed on rotation lock member 40 to preferably come in contact with the electrode terminal 344 provided on the throttle lever 34. As would be understood by someone of ordinary skill in the art, other arrangements for interrupting electric power supplied sparkplug 248, such as, for example, using microcomputer controls, or, alternatively, an arrangement for limiting the amount of fuel-air mixture supplied which either stops engine 24 or idles engine 24 may also be used.

An engine-powered tool 1001 according to embodiment 2 of the present application will be described hereafter with reference to FIGS. 17 through 25. Members that are the same as members described for the engine-powered tool 1 according to Embodiment 1 above of the present invention are labeled with the same numbers, and explanation of such will be omitted here.

Figure 17:
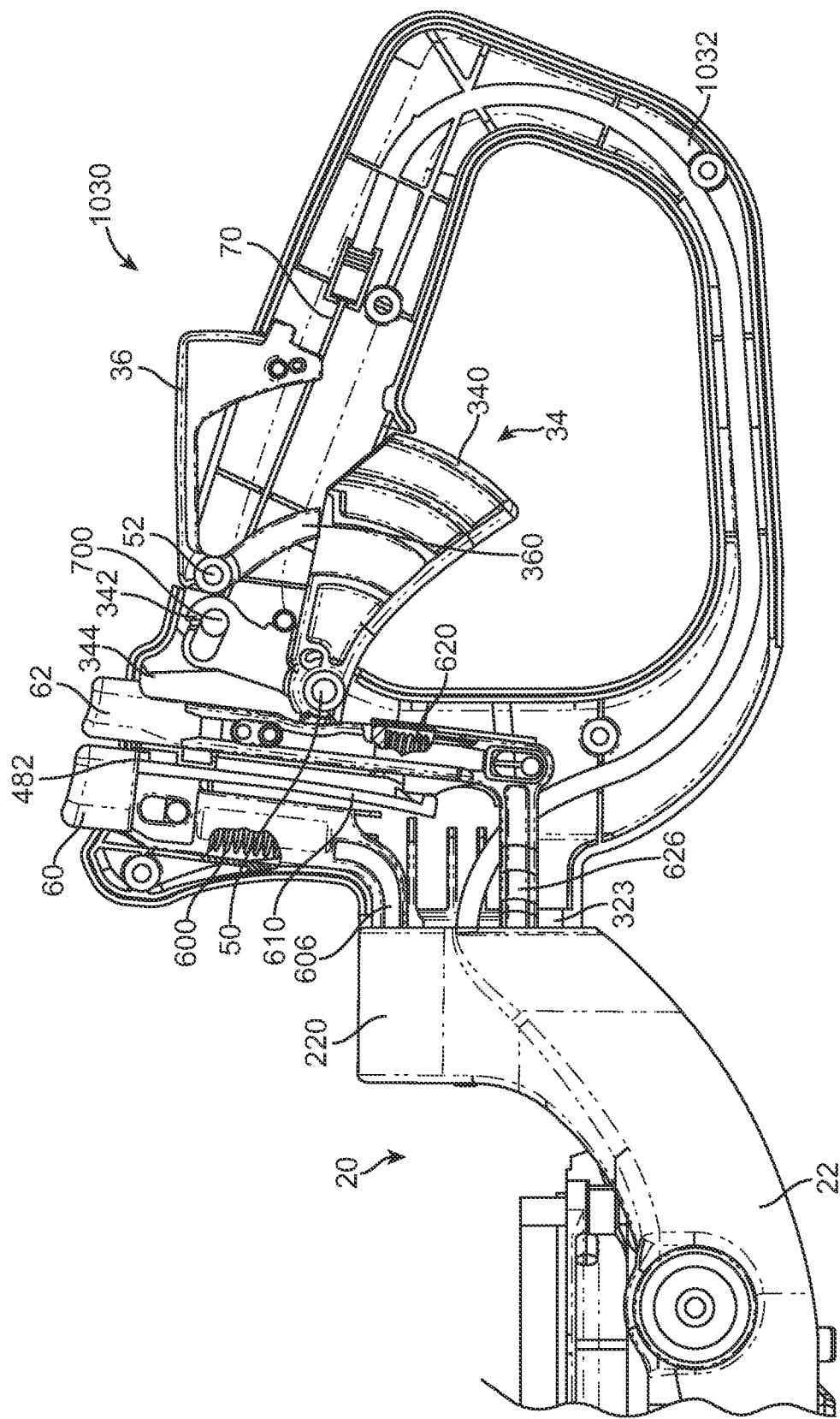
FIG. 17 is a cross-sectional view showing the inside of the handle of the engine-powered tool shown in FIG. 15.

The rear handle 1030 (hereinafter referred to simply as the handle of the engine-powered tool 1001) is preferably virtually the same as the engine-powered tool 1 according to embodiment 1, and is preferably made up of a handle body 1032, a throttle lever (operation lever) 34, a safety lever 36, a stop switch 38, a lock release button (first operation unit) 60 and a lock button (second operation unit) 62. FIG. 17 shows a detailed cross-sectional view of rear handle 1030.

As shown in FIG. 17, handle body 1032 is preferably used concurrently with the front handle 28 for gripping the engine-powered tool 1001. The handle body 1032 is preferably roughly D-shaped. In addition, the handle body 1032 is preferably formed so that the preferably roughly cylindrical body connector 320 (see FIG. 18C) protrudes and operably connects to the support frame 22. In addition, a slit 322, through which the later-described press insertion protrusion 606 (also called the limiting device or the rotational position determining unit) preferably passes is preferably formed in the body connector 320. Furthermore, a slit 323, through which the later-described protrusion 626 preferably passes is preferably formed facing the slit 322.

The throttle lever 34 is preferably used for regulating the supply of mixed gas to the engine 24. The throttle lever 34 is preferably formed in a roughly L-shape and is preferably rotatably supported by a rotation axis 50 substantially in the middle of the handle body 1032. When the throttle lever 34 is not operated, one end 340 preferably protrudes from the bottom surface of the handle body 1032. In addition, a wire 70 is preferably connected to the other end 342. The wire 70 preferably passes through the inside of the handle body 1032, with one end preferably anchored to the other end 342 of the throttle lever 34 and the other end preferably anchored to a valve (not shown) that regulates the supply of mixed gas.

By pressing the one end 340 of the throttle lever 34 upward, the throttle lever preferably rotates in a counterclockwise direction, as shown in FIG. 17, about the rotation axis 50. Mixed gas supplied to the engine 24 increases as throttle lever 34 rotates further in the counterclockwise direction, which means workload is increasing. In addition, when the throttle lever 34 is not pulled, the engine 24 preferably falls below a prescribed number of revolutions and the engine 24 idles. In this case, a centrifugal clutch (not shown) cuts the transmission of power to the lower blade 12 from the engine 24.

In addition, an electrode terminal (also called a drive control device or the second electrode terminal) 344 is preferably attached to the other end 342 of the throttle lever 34 and preferably stops the supply of electric power to the later-described ignition device 246 by making contact with the later-described electrode terminal (also called the drive control device or first electrode terminal) 482. These actions will be described in detail hereafter.

The safety lever 36 preferably limits inadvertent operation of the throttle lever 34. The safety lever 36 preferably has a rotation axis 52 substantially in the middle and a protrusion 360 that protrudes downward from the rotation axis 52, as shown in FIG. 17. When safety lever 36 protrudes from the handle body 1032, the protrusion 360 of the safety lever 36 preferably abuts the throttle lever 34, limiting the effect of pulling the throttle lever 34. In addition, the safety lever 36 preferably permits the throttle lever 34 to rotate clockwise about the rotation axis 52 so that the protrusion 360 of the safety lever 36 does not abut the throttle lever 34.

Figure 15:
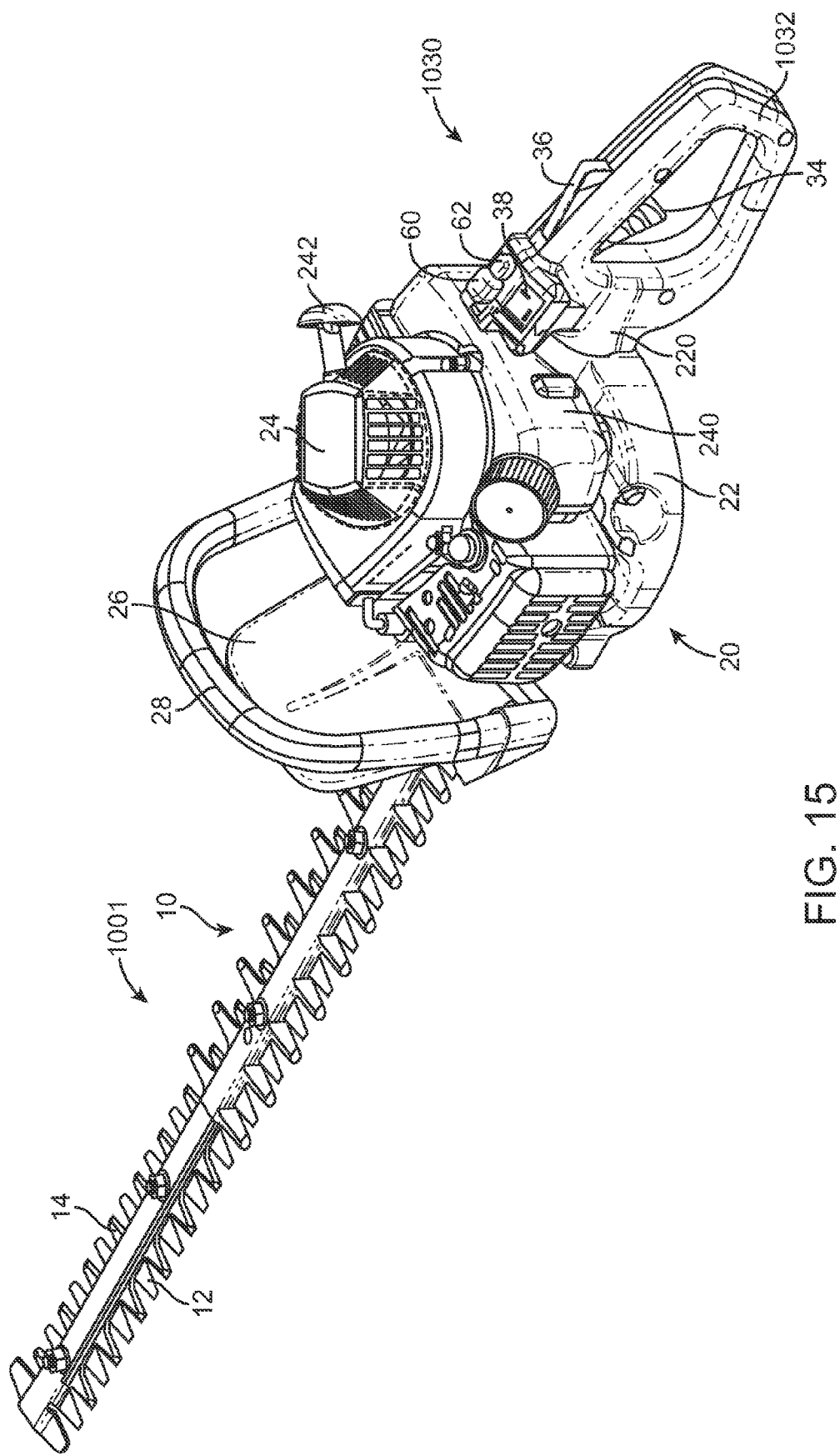
FIG. 15 is an oblique view showing the engine-powered tool according to Embodiment 2.

Stop switch 38 is preferably formed on the top of the handle body 1032 as shown in FIGS. 15, 16A and 16B and is preferably made up of a switch that preferably stops the supply of electric power to the later-described ignition device 246 when closed. The electrical composition of the stop switch 38 will be described hereafter.

In addition, the rear handle 1030 is preferably provided with a lock button 62 for locking rotation of the rear handle 1030 with respect to the tool body 20 and lock release button 60 for releasing the lock. The lock release button 60 and lock button 62 will be described hereafter with reference to FIGS. 17, 18A, 18B and 18C.

The lock release button 60 is preferably provided on the top surface of the handle body 1032 and is preferably supported on the handle body 1032 so as to be capable of moving up and down in a roughly vertical direction on the top surface of the handle body 1032. Specifically, the lock release button 60 is preferably positioned on the top surface of the handle body 1032 in a position where the operator can readily operate lock release button 60 with their thumb while gripping the rear handle 1030. Furthermore, the press insertion protrusion 606 that engages with the press insertion indentations (also called indentations or rotational position determining units) 222 described below with reference to FIG. 18C is preferably integrally formed on the lock release button 60. The press insertion protrusion 606 is preferably bent in an L-shape in the direction of the handle connector 220 of the tool body 20 and is positioned at the slit 322 of the body connector 320. In addition, the lock release button 60 is constantly spring-loaded in the direction protruding to the outside of the tool body 20 by a spring (elastic member) 600.

The lock button 62 is preferably provided on the top surface of the handle body 1032 and is preferably positioned closer to the rear handle 1030 than the lock release button 60. The lock button 62 is preferably supported on the handle body 1032 so as to be capable of moving up and down in a preferably roughly vertical direction on the top surface of the handle body 1032. Specifically, the lock button 62, like the lock release button 60, is preferably positioned on the top surface of the handle body 1032 in a position where an operator can readily operate this button with their thumb when gripping the rear handle 1030. Furthermore, a protrusion 626 that is adapted to engage with press insertion indentations 222 described below with reference to FIG. 18C is preferably formed integrally on the lock button 62. The protrusion 626 is preferably bent in an L-shape in the direction of the handle connector 220 of the tool body 20 and is preferably positioned at the slit 323 of the body connector 320. In addition, the lock button 62 is preferably constantly spring-loaded by spring 620 in an outward direction from the tool body 20.

In addition, the press insertion indentations 222 are formed radially in eight locations at preferably approximately 45° intervals centered on the axis of rotation, in the handle connector 220 of the tool body 20 connected to the rear handle 1030. The press insertion indentations 222 preferably engage with protrusion 626 when the lock button 62 is operated, and engage with press insertion protrusion 606 when lock release button 60 is pressed. The rear handle 1030 is anchored in the rotational direction with respect to the support frame 22 by the press insertion protrusion 606 engaging with press insertion indentations 222.

The engagement stop unit of the lock release button 60 and the lock button 62 will be described hereafter with reference to FIGS. 19A, 19B, 20A and 20B, in which the tool body 20 and the rear handle 1030 are perpendicular to each other.

A lock plate 610 is preferably anchored to the lock release button 60 so as to extend in the swinging direction of the lock release button 60. The lock plate 610 is preferably on the lock button 62 side of the press insertion protrusion 606 and preferably has an engagement stop protrusion (engagement stop unit) 608 with a triangular cross-section that preferably protrudes to the lock button 62 side. In addition, an engagement stop release protrusion 609 is preferably formed on the bottom edge of the lock plate 610.

An engagement stop protrusion (engagement stop unit) 328 that preferably protrudes toward the lock release button 60 side is preferably formed on the surface of a rib 329, which is preferably formed in the handle body 1032 facing the engagement stop protrusion 608. The engagement stop protrusion 328, which preferably has a triangular cross-section, and the bottom surface of the engagement stop protrusion 328 preferably engages into the top surface of the engagement stop protrusion 608. In addition, an engagement stop release protrusion 629 preferably having a trapezoidal cross-section is preferably formed on the side surface of the lock button 62 facing the lock plate 610.

In addition, anchoring of the rear handle 1030 and tool body 20 in the direction of rotation is preferably accomplished by the engagement stop protrusion 606 preferably formed integrally with the lock release button 60 interlocking in one of the press insertion indentations 222. When this anchored state is released, the lock release button 60 is preferably pressed to the handle body 1032 side in resistance to the spring-loaded force of the spring 600. Accordingly, the press insertion protrusion 606 is disengaged from the press insertion indentation 222, and the rear handle 1030 can rotate with respect to the main body 20. The engagement stop protrusion 608 preferably formed on the lock plate 610 of the lock release button 60 preferably locks into the engagement stop protrusion 328 formed in the rib 329 of the handle body 1032 in order to maintain a rotatable state.

Figure 20A:
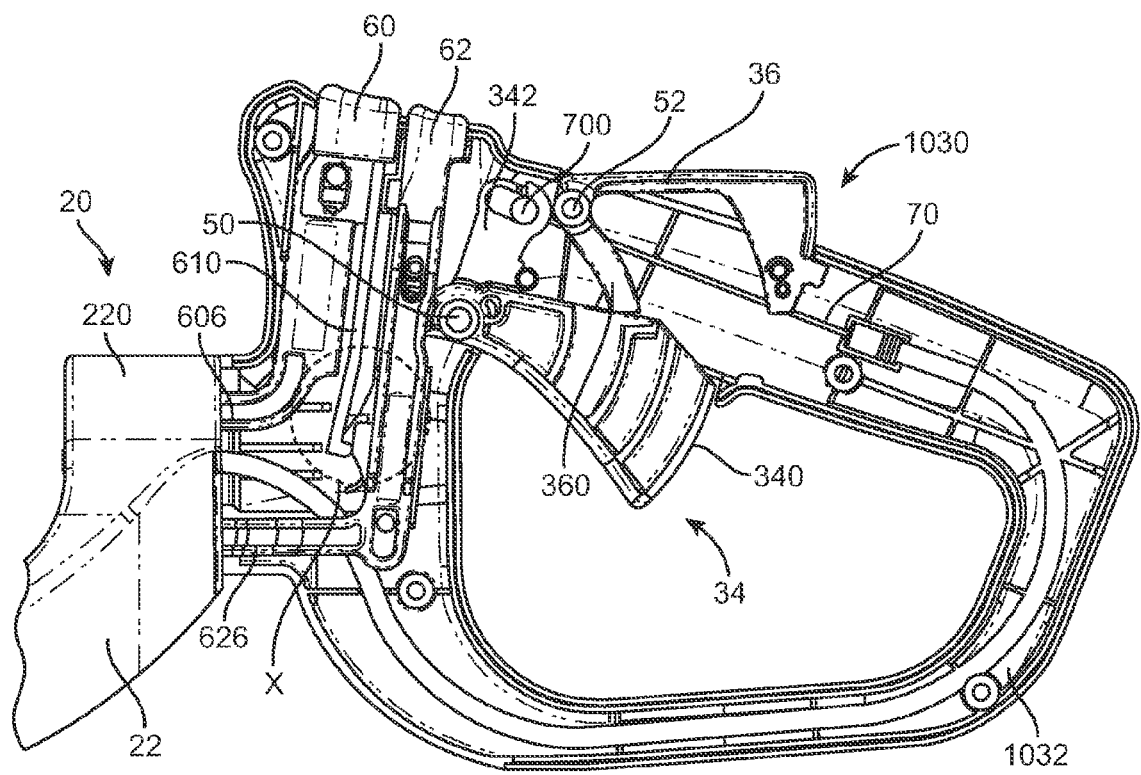
FIG. 20A is a cross-sectional view of the handle when the lock button has been pressed with the lock release button in a pressed state in the engine-powered tool shown in FIG. 15.
Figure 20B:
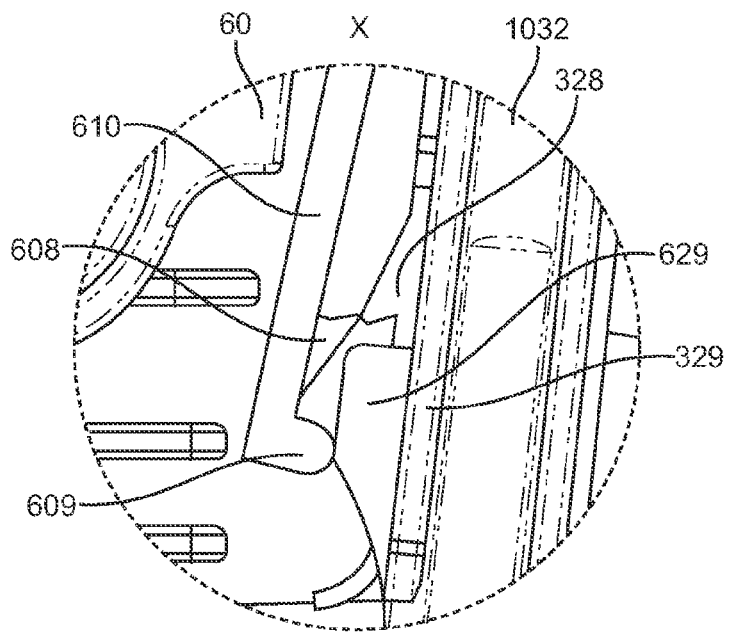
FIG. 20B is an enlarged cross-sectional view showing the engagement stop units of the lock release button and the lock button of the engine-powered tool in part X shown in FIG. 20A.

When returning to the anchored state, the lock button 62 is pressed toward the handle body 1032 side with resistance to the spring-loaded force of the spring 620. Accordingly, the engagement stop release protrusion 609 is forced upward to the top of the lock release protrusion 629, the lock plate 610 deforms, and the engagement stop protrusion 608 is disengaged from the engagement stop protrusion 328, as shown in FIG. 20B. When the engagement stop protrusion 608 is disengaged from the engagement stop protrusion 328, the lock release button 60 and the press insertion protrusion 606, anchored to the lock release button 60, move upward under the force of the spring 600. Through this, the press insertion protrusion 606 engages with a press insertion indentation 222 and the tool body 20 and rear handle 1030 become anchored.

The anchoring and anchor release action of tool body 20 and the rear handle 1030, when the tool body 20 is inclined on the rear handle 1030, will be described hereafter with reference to FIGS. 21A, 21B, 21C, 22A, 22B and 22C.

Figure 19A:
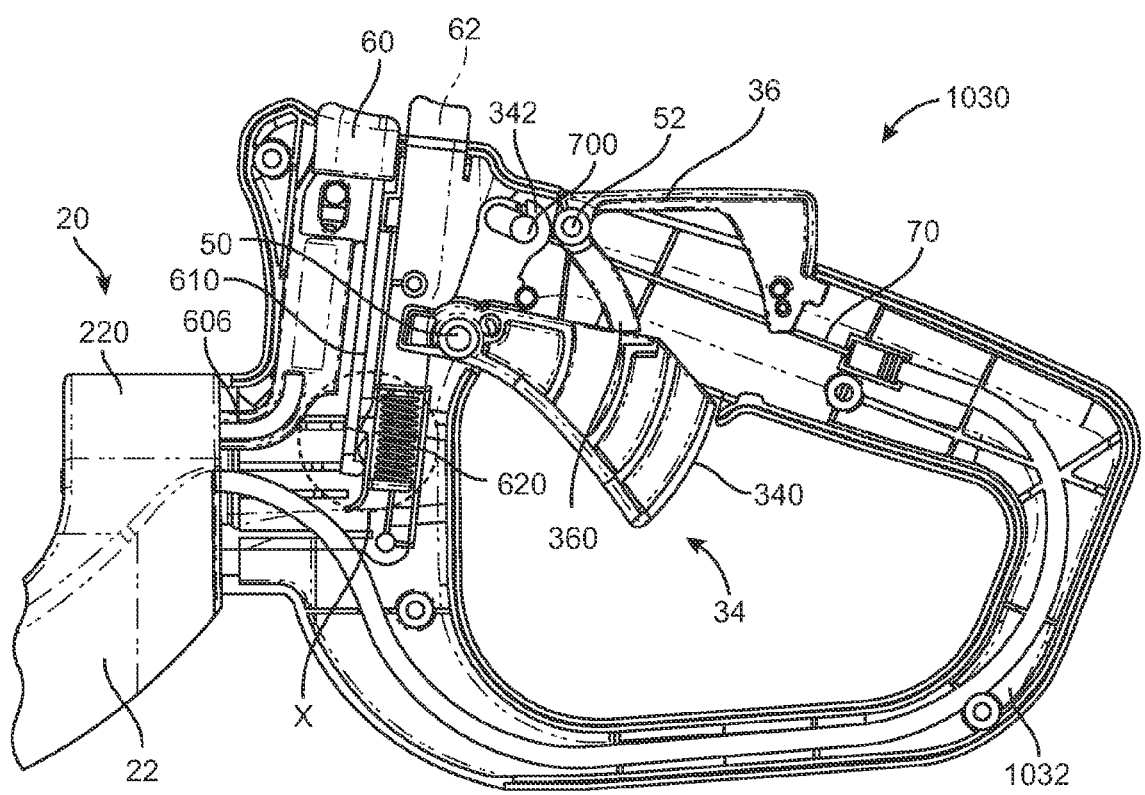
FIG. 19A is a cross-sectional view showing the handle in a state in which the lock release button has been pressed in the engine-powered tool shown in FIG. 15.
Figure 19B:
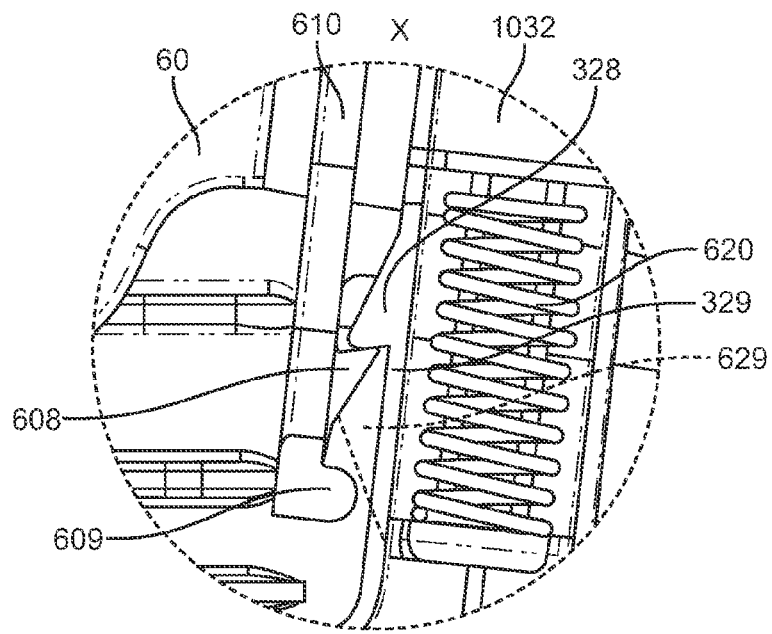
FIG. 19B is an enlarged cross-sectional view showing the engagement stop unit of the lock release button and the lock button of the engine-powered tool in part X shown in FIG. 19A.

FIGS. 21A, 21B and 21C show the state in which the rear handle 1030 rotated approximately 22.5° in the counterclockwise direction from a position orthogonal to the tool body 20. In this state, the press insertion protrusion 606 and the protrusion 626 are not aligned with any insertion indentation 222 of the handle connector 220 as shown in FIG. 21C. If the lock button 62 is pressed in this state, the protrusion 626 contacts the inner surface of the handle connector 220 and does not enter a press insertion indentation 222. Accordingly, movement of the lock button 62 to the inside of the handle body 1032 is inhibited, so engagement of the engagement stop protrusion 328 and the engagement stop protrusion 608 is maintained, as shown in FIGS. 19A and 19B.

Figure 22A:
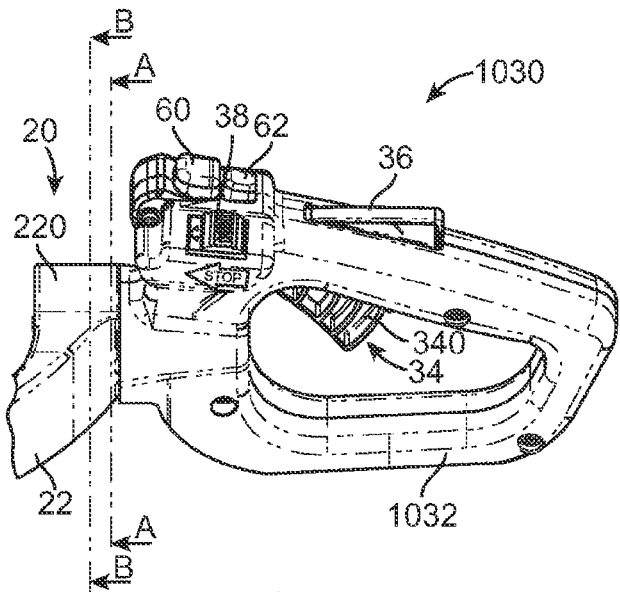
FIG. 22A is a side view of the engine-powered tool shown in FIG. 15 when the handle of the engine-powered tool is in an inclined state.
Figure 22B:
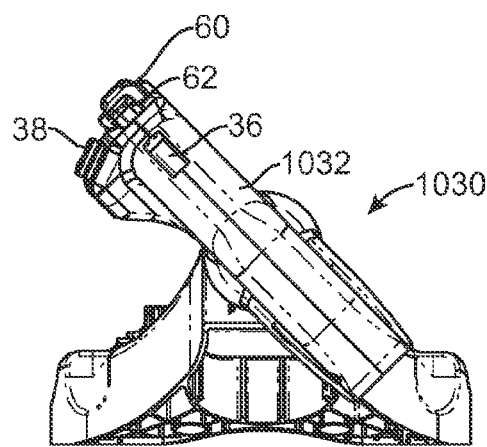
FIG. 22B is a front view corresponding to FIG. 22A.
Figure 22C:
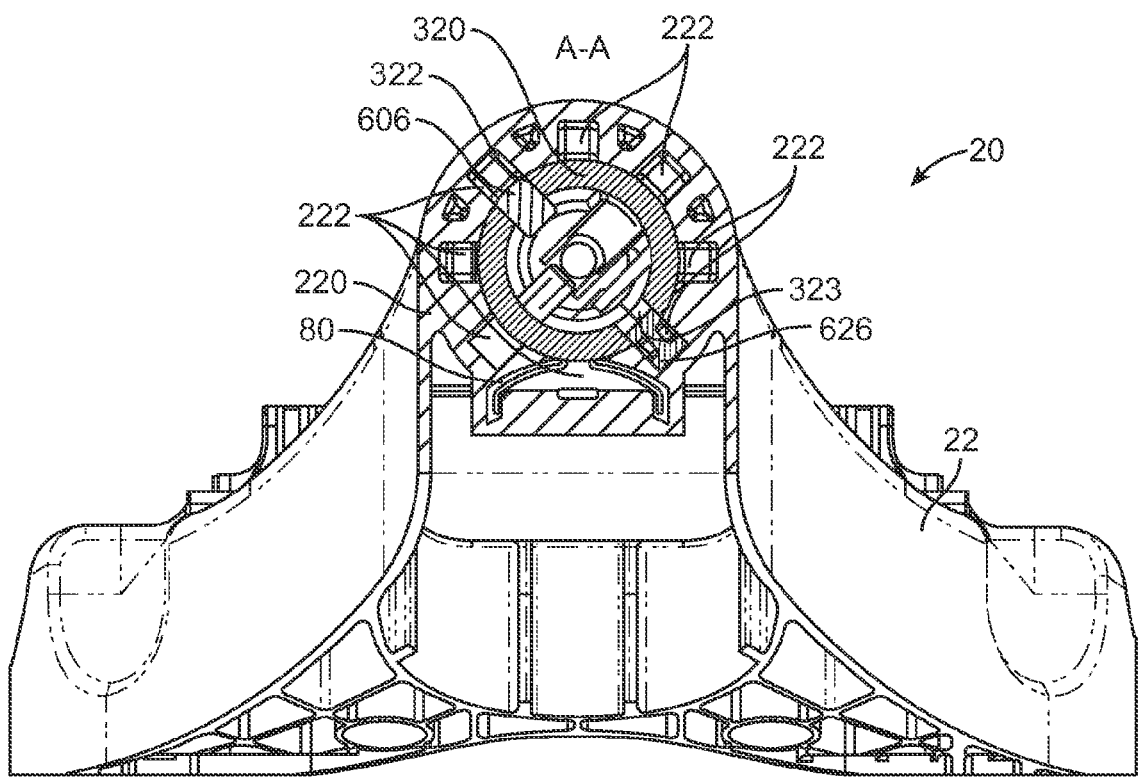
FIG. 22C is a cross-sectional view taken along line A-A in FIG. 22A.

FIGS. 22A, 22B and 22C show a state in which the rear handle 1030 is rotated approximately 45° in the counterclockwise direction from a position orthogonal to the tool body 20. In this state, the press insertion protrusion 606 and the protrusion 626 are aligned with press insertion indentations 222 of the handle connector 220. When the lock button 62 is pressed, the protrusion 626 enters and engages with insertion indentation 222, as shown in FIG. 22C. Concurrently, the lock button 62 moves toward the inside of the handle body 1032, and the engagement stop protrusion 328 disengages from the engagement stop protrusion 608, as shown in FIGS. 20A and 20B. When the engagement stop protrusion 328 and the engagement stop protrusion 608 are disengaged, the lock button 62 protrudes toward the outside of the tool body 20 under the force of the spring 600. Through this action, the press insertion protrusion 606 engages with the press insertion indentation 222, and the rear handle 1030 becomes anchored to the tool body 20.

Figure 23:
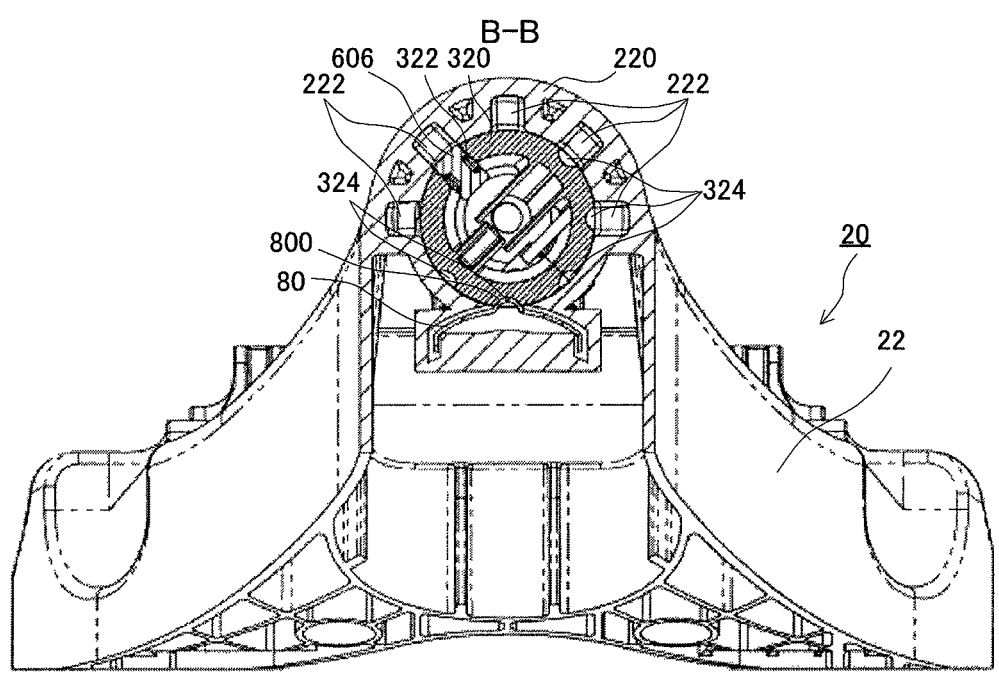
FIG. 23 is a cross-sectional view taken along line B-B in FIG. 22A.

The structure that signals an operator that the press insertion protrusion 606 and the protrusion 626 are aligned with press insertion indentations 222 during rotation of the rear handle 1030 will be described hereafter with reference to FIG. 23. FIG. 23 is a cross-section taken along line B-B in FIG. 22A, which is to the blade 10 side of the cross-section along line A-A.

As shown in FIG. 23, a plate spring 80 is preferably provided on the bottom of the handle connector 220, bent toward the body connector 320. An engagement stop protrusion 800 is preferably formed preferably substantially in the center of the plate spring 80 in the latitudinal direction. The engagement stop protrusion 800 preferably constantly abuts the outer surface of the body connector 320 under the elastic force of the plate spring 80. In addition, engagement stop holes 324 are preferably formed at five locations at preferably approximately 45° intervals about the axis of rotation on the outer surface of the body connector 320.

The engagement stop holes 324 are preferably formed with the same angular spacing as the press insertion indentations 222 so that the press insertion protrusion 606 and the press insertion indentations 222 align with each other when the engagement stop protrusion 800 and the engagement stop holes 324 lock together. Through this, the operator will be signaled that the engagement stop protrusion 606 is positioned in alignment with the press insertion indentation 222 through the sound and resistance of the engagement stop protrusion 800 engaging with an engagement stop hole 324. Accordingly, the operator can, upon being signaled that rear handle 1030 is anchorable, press the lock button 62 to engage the press insertion protrusion 606 and the press insertion indentation 222, so that the rear handle 1030 can be readily anchored. The angles and number of engagement stop holes 324 and press insertion indentations 222 may be arbitrarily changed in accordance with the desired specifications.

Figure 24:
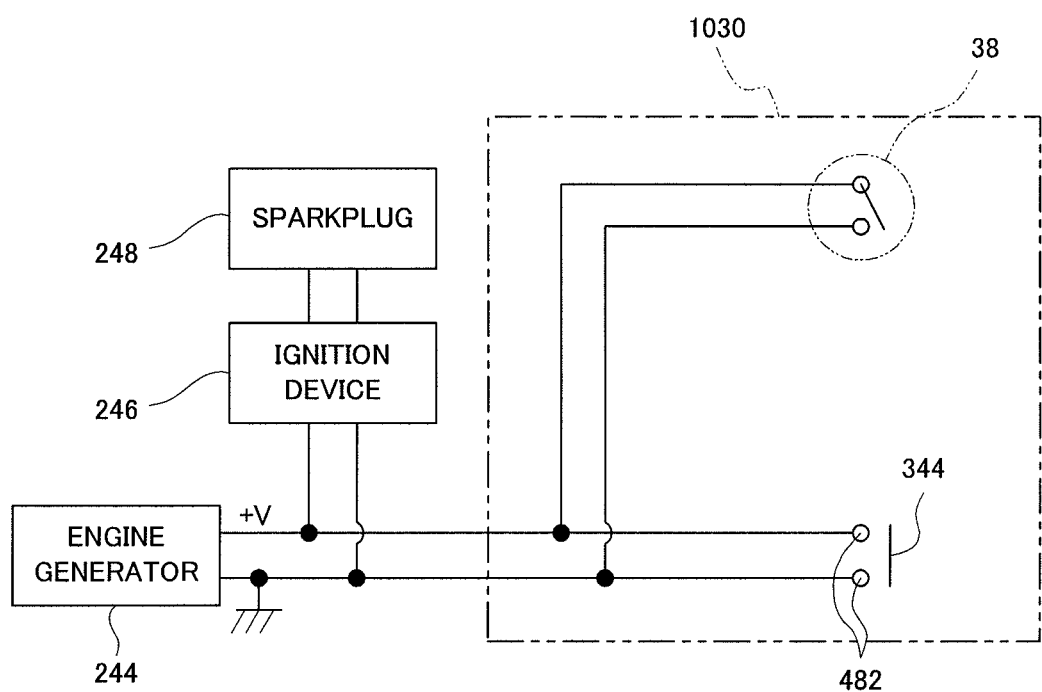
FIG. 24 is a circuit diagram relating to the electrode terminals provided in the throttle lever and the rotation lock member of the engine-powered tool shown in FIG. 15.

The supply of electric power to the sparkplug 248 in the engine 24 will be described hereafter with reference to FIG. 24. The supply of electric power to the sparkplug 248 is accomplished by an engine generator 244 that generates electricity through power from the engine 24, and an ignition device 246 that is connected to a terminal of the engine generator 244 and preferably impresses an ignition voltage on the sparkplug 248. A stop switch 38 is preferably electrically connected between the two output terminals of the engine generator 244. When the stop switch 38 is closed, the two output terminals of the engine generator 244 are short-circuited. As a result, the supply of electric power for ignition to the ignition device 246 from the engine generator 244 is halted, thereby halting the supply of electric power to the sparkplug 248 from the ignition device 246.

Figure 25:
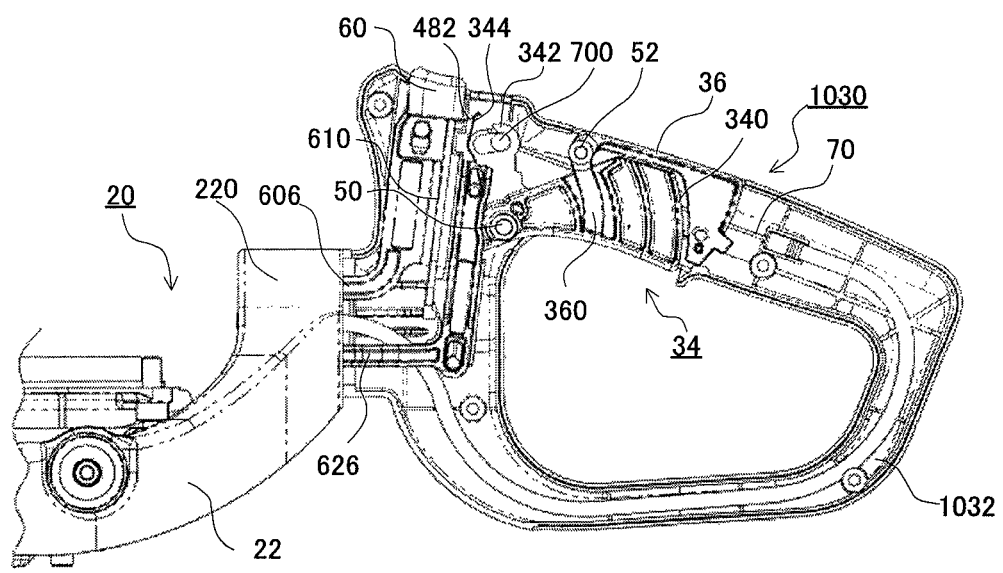
FIG. 25 is a side cross-sectional view of the handle showing the state when the throttle lever is pulled with the lock release button in a pressed state in the engine-powered tool shown in FIG. 15.

The structure that prevents the supply of electric power to the engine 24 in a rotatable state will be described hereafter with reference to FIGS. 24 and 25. FIG. 25 omits the lock button 62 in order to show the necessary parts of this structure.

An electrode terminal 482 that preferably extends toward the lock button 62 side is anchored to the lock release button 60. In addition, an electrode terminal 344 that preferably extends toward to the lock release button 60 side is anchored on the other end 342 of the throttle lever 34. The electrode terminal 344 is preferably positioned so as to contact the electrode terminal 482 when the throttle lever 34 is pulled while the lock release button 60 is in a pressed state (rotatable state). Furthermore, the electrode terminal 344 is preferably positioned so as to not contact the electrode terminal 482 when the lock release button 60 is not pressed or when the throttle lever 34 is not being pulled.

The electrode terminal 344 is preferably electrically connected to one of the output terminals of the engine generator 244. The electrode terminal 482, which is preferably provided on the lock release button 60, is preferably electrically connected to the other output terminal of the engine generator 244. The electrode terminal 344, which is preferably positioned on the other end 342 of the throttle lever 34, preferably makes contact with the electrode terminal 482 accompanying operation of the throttle lever 34, and the two output terminals of the engine generator 244 are short-circuited. As a result, the supply of electric power for ignition to the ignition device 246 from the engine generator 244 is halted, therefore also halting the supply of electric power to the sparkplug 248 from the ignition device 246.

In the hand-held engine-powered tool 1001 according to the above embodiment, the lock release button 60 and the lock button 62 are preferably positioned near each other on opposite sides of the throttle lever 34 in the handle body 1032. As a result, the operator can accomplish the handle lock release operation and the rotation lock operation separately with the lock release button 60 and lock button 62, and because the positioning is concentrated, can readily adjust the angle of the rear handle 1030 smoothly without significantly disrupting the operator from operating the throttle lever 34.

In addition, by simply confirming the position of the lock release button 60, the operator can confirm whether the rear handle 1030 is in a rotatable state or a rotation lock state.

Moreover, when the rear handle 1030 is in a rotatable state, the engagement stop protrusion 608 provided on the lock release button 60 and the engagement stop protrusion 328 provided on the handle body 1032 are engaged. Through this, it is possible to maintain the rotatable state without applying any particular force. Furthermore, by simply pressing the lock button 62, the engagement stop protrusion 328 can be disengaged from the engagement stop protrusion 608 which is provided on the lock release button 60. Furthermore, the press insertion protrusion 606 provided on the lock release button 60 is forced by spring 600 in a direction that achieves a rotation lock state. Accordingly, by disengaging the engagement stop protrusion 608 and the engagement stop protrusion 328, it is possible to switch the rear handle 1030 to an unrotatable state from a rotatable state.

In addition, press insertion indentations 222 are preferably formed in the handle connector 220 in multiple locations, so as to respectively align with each other. Consequently, when the press insertion protrusion 606 is not aligned with a press insertion indentation 222, the protrusion 626 is also not aligned with a press insertion indentation 222; therefore, operation of the lock button anchored to the protrusion 626 is prevented, application of unreasonable force to the lock button 62 and the press insertion protrusion 606 is prevented, and the life of the engine powered tool 1001 can be extended.

When the throttle lever 34 is pulled while rotation of the rear handle 1030 is permitted, driving of the engine 24 stops. When the structures and equivalent structures of the present application are employed, it is possible to prevent inadvertent trimming of unintended locations when rotating the rear handle 1030.

Specifically, when the throttle lever 34 is pulled with the lock release button 60 of the rear handle 1030 in a rotatable state, the electrode terminal 482 provided on the lock release button 60 and the electrode terminal 344 provided on the throttle lever 34 contact each other. Through this contact, the output terminals of the engine generator 244 are short-circuited and the supply of electric power to the sparkplug 248 is halted. Through these foregoing actions, it is possible to prevent blade 10 from moving during rotation of the rear handle 1030.

In addition, by preferably providing a plurality of press insertion indentations 222 on the handle connector 220 of the tool body 20 so as to align the press insertion protrusion 606 of the lock release button 60, it is possible to anchor the rear handle 1030 to the tool body 20 at angles corresponding to locations where the press insertion indentations 222 are provided.

Furthermore, a plate spring 80 having an engagement stop protrusion 800 is preferably formed in one area of the handle connector 220, which is preferably provided on support stand 22. A plurality of engagement stop holes 324 are preferably provided on the body connector 320 of the handle body 1032. When the rear handle 1030 is rotated, it is possible to signal the operator that an angle where the rear handle 1030 can be anchored has been located, meaning that the engagement stop position of the engagement stop protrusion 800 and an engagement stop hole 324 coincide with the position where the press insertion protrusion 606 and a press insertion indentation 222 are aligned. After the operator has been signaled that an angle suitable for anchoring the rear handle 1030 has been located, the press insertion protrusion 606 and the press insertion indentation 222 can be readily engaged by pressing the lock button 62, making it possible to anchor the rear handle 1030.

Furthermore, by providing a centrifugal clutch (not shown), it is possible for the rear handle 1030 to be rotated while engine 24 is idle. By enabling this, it is possible to restart operations swiftly after the rear handle 1030 has been rotated to the desired angle.

The present application is not limited to the trimmer recited, and can also be applied to cutters or chain saws.

In addition, the present application includes an arrangement for short-circuiting the output terminals of the engine generator 244 and interrupting electric power supplied to the sparkplug 248 by having the electrode terminal 482 provided on the lock release button 60 to come into contact with electrode terminal 344 provided on the throttle lever 34. As would be understood by one of ordinary skill in the art, other arrangements for interrupting the electric power supplied to the sparkplug 248 may be utilized, such as, for example, micro-computer controls, or an arrangement that limits the amount of fuel-air mixture supplied and, either stops the engine 24 or places it into an idling state, may be utilized.

Having described and illustrated the principles of this application by reference to one (or more preferred embodiment(s), it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. A hand-held engine-powered tool comprising, an engine having an ignition device;
   a body for supporting the engine;
   a handle rotatably connected to the body;
   a limiting member for anchoring the handle to the body, limiting rotation of the handle;
   an operation unit provided on the handle for regulating mixed gas supplied to the engine in accordance with an operating amount; and
   a drive control device which permits the engine to operate when the limiting member is limiting rotation of the handle, and stops the engine when both the limiting member permits rotation of the handle and the operation unit is in operating state.

2. The hand-held engine-powered tool according to claim 1, wherein:
   the drive control device permits driving of the engine by supplying electric power for ignition to an ignition device of the engine and stops the engine by stopping the supply of electricity to the ignition device.

3. The hand-held engine-powered tool according to claim 1, wherein:
   the limiting member limits rotation of the handle when positioned in a first position and permits rotation of the handle when positioned in a second position, the limiting member having a first electrode terminal;
   the operation unit has a second electrode terminal adapted for contact with the first electrode terminal when the operation unit is operated with the limiting member positioned at the second position; and
   the drive control device stops the supply of electric power to the ignition device of the engine when the first electrode terminal and the second electrode terminal are in contact.

4. The hand-held engine-powered tool according to claim 1, wherein:
   the limiting member limits rotation of the handle when positioned in the first position and permits rotation of the handle when positioned in the second position, the limiting member having a limit release prevention unit that prevents the limiting member from changing from the first position to the second position when the operation unit is in operating state.

5. The hand-held engine-powered tool according to claim 4, further comprising:
   the limit release prevention unit formed on the limiting member, wherein the limit release prevention unit comprises an engagement unit that engages with the operation unit by the limiting member moving toward the second position when the operation unit is in operating state.

6. The hand-held engine-powered tool according to claim 1, further comprising:
   a rotational position determining unit for determining the rotational position between the body and the handle.

7. The hand-held engine-powered tool according to claim 6, wherein:
   the limiting member is formed on the handle; and
   a plurality of indentations are formed on the body,
   wherein the limiting member can engage with an indentation to serve as the rotational position determining unit.

8. The hand-held engine-powered tool according to claim 7, further comprising:
   a plurality of engagement stop holes formed on the handle having the same angular spacing as the angular spacing connecting the plurality of indentations provided on the body and the rotational axis of the handle;
   engagement stop protrusions formed on the body that lock in the engagement stop holes wherein the plurality of engagement stop holes and engagement stop protrusions engage when an indentation and the limiting member are aligned.

9. The hand-held engine-powered tool according to claim 1, further comprising:
   a centrifugal clutch positioned between the engine and a blade driven by the engine, wherein the centrifugal clutch interrupts the drive power to the blade when the engine falls below a predetermined number of revolutions.

* * * * *